United States Patent [19]

Roberts et al.

[11] Patent Number: 4,794,461

[45] Date of Patent: Dec. 27, 1988

[54] METHOD AND APPARATUS FOR BLOCK CODING VERTICAL MODE CODES FOR ENHANCED COMPRESSION OF IMAGE DATA

[75] Inventors: Lawrence G. Roberts, Woodside; Alex E. Henderson, El Granada; Fredrick L. Drain, San Francisco, all of Calif.

[73] Assignee: Netexpress Systems, Inc., San Mateo, Calif.

[21] Appl. No.: 905,829

[22] Filed: Sep. 10, 1986

[51] Int. Cl.$^4$ ............... H04N 1/417; H04N 1/411; H04N 1/413

[52] U.S. Cl. .................... 358/261.3; 358/260

[58] Field of Search ............... 358/260, 261

[56] References Cited

U.S. PATENT DOCUMENTS

| | | | |
|---|---|---|---|
| 4,144,547 | 3/1979 | Stoffel | 358/260 |
| 4,215,375 | 7/1980 | Usubuchi et al. | 358/261 |
| 4,399,467 | 8/1983 | Subramaniam | 358/261 |
| 4,425,582 | 1/1984 | Kadakia et al. | 358/260 |
| 4,511,213 | 4/1985 | Yamazaki et al. | 358/260 |
| 4,559,563 | 12/1985 | Joiner, Jr. | 358/260 |
| 4,571,634 | 2/1986 | Caneschi et al. | 358/260 |
| 4,631,521 | 12/1986 | El-Sherbini | 358/260 |
| 4,633,325 | 12/1986 | Usubuchi | 358/260 |
| 4,667,251 | 5/1987 | Hasegawa | 358/261 |
| 4,673,987 | 6/1987 | Toyokawa | 358/260 |
| 4,729,034 | 3/1988 | Roberts et al. | 358/261 |

FOREIGN PATENT DOCUMENTS

| | | | |
|---|---|---|---|
| 57-183174 | 11/1982 | Japan | 358/261 |
| 57-190461 | 11/1982 | Japan | 358/261 |
| 58-54778 | 3/1983 | Japan | 358/261 |
| 59-2485 | 1/1984 | Japan | 358/260 |
| 60-169276 | 9/1985 | Japan | 358/260 |

OTHER PUBLICATIONS

Usubuchi, Touro, et al., "Adaptive Predictive Coding for Newspaper Facsimile", *Proceedings of the IEEE*, vol. 68, No. 7, Jul. 1980, pp. 807–813.

Johnsen, O., "A New Code for Transmission of Ordered Dither Pictures", *The Bell System Technical Journal*, vol. 60, No. 3, Mar. 1981, pp. 379–389.

Johnsen, O., et al., "An Extension of the CCITT Facsimile Codes for Dithered Pictures", *The Bell System Technical Journal*, vol. 60, No. 3, Mar. 1981, pp. 391–404.

Liao, Henry H., "Adaptive Predictor for Halftone or Line Graphics", *Xerox Disclosure Journal*, vol. 6, No. 5, Sep./Oct. 1981, pp. 281–282.

*Primary Examiner*—James J. Groody
*Assistant Examiner*—Randall S. Svihla
*Attorney, Agent, or Firm*—Townsend and Townsend

[57] ABSTRACT

A method and apparatus for improving the performance of data compression processes, such as relative address coding, CCITT standard facsimile processes, and similar two-dimensional image coding processes, by block coding one or more of the vertical mode codes produced by these processes. The performance of data compression processes is improved by representing one or more sequences of vertical mode code words with a single block code word. A reference scan line is preferably selected from among a plurality of previous scan lines, for example, the immediately preceding ten scan lines, for two-dimensional image coding. The previous scan line which is most similar to the current scan line to be coded is selected as the reference scan line. The selected reference scan line is then fed with the current scan line to be coded to a two-dimensional data compression coding process so as to yield a first tier of data compression. The image data are preferably checked during the two-dimensional data compression coding process for a predetermined run of a given vertical mode code, and a preselected block code is substituted if the predetermined run of the given vertical mode code appears so as to yield a second tier of data compression. Preferably, eleven consecutive vertical offset zero code words are represented by a single block code word. This provides enhanced data compression and reduces the amount of image data stored or transmitted and concomitantly lowers the cost for operation of the image data storage or transmission apparatus.

18 Claims, 9 Drawing Sheets

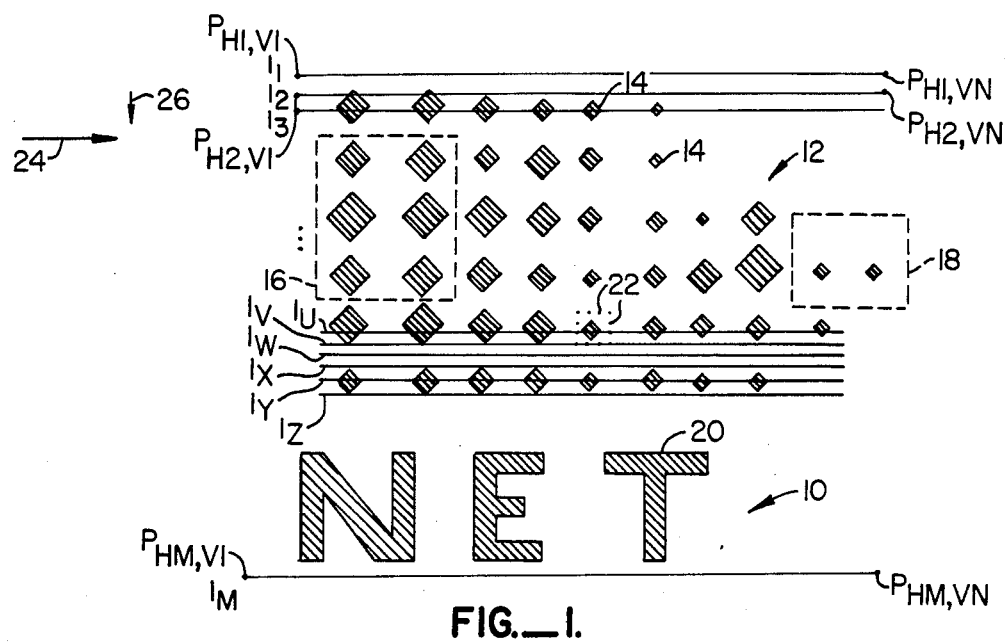
FIG._1.
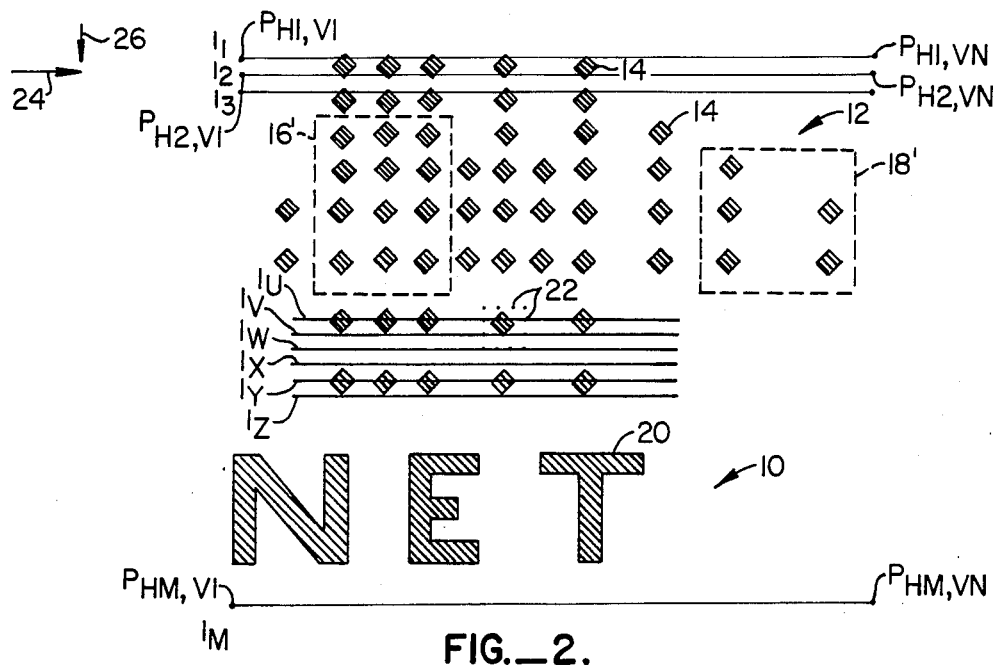
FIG._2.

METHOD AND APPARATUS FOR BLOCK CODING VERTICAL MODE CODES FOR ENHANCED COMPRESSION OF IMAGE DATA

BACKGROUND OF THE INVENTION

This invention relates to the field of data compression. More particularly, the invention relates to data compression associated with image data storage or transmission, especially in connection with two-dimensional image coding involving data compression of image data representing screened images which utilizes vertical mode coding. Specifically, the invention is directed to a method and apparatus for block coding image data during the process of being coded utilizing a vertical mode coding technique, thereby providing enhanced data compression in order to further economize image data storage or transmission requirements.

In one aspect, for example, the invention relates to image data transmission. Equipment for telecommunication of two-dimensional images is known. The images can comprise text, as well as pictorial information, such as illustrations, photographs, and graphic information. Known telecommunication equipment comprises a system whereby a transmitter at one location encodes the image, the encoded image data is communicated over a communication link, such as a telephone line, to a receiver at another location, and the receiver decodes the image data. Consequently, a facsimile of the original image is communicated over a distance from the transmitter to the receiver. Hence, the telecommunication equipment has become known as facsimile transmission equipment.

Facsimile transmission equipment is commercially available from various manufacturers. In order to provide compatiblity among the facsimile transmission equipment constructed by different manufacturers, various standards have been adopted. Known facsimile transmission equipment is typically standardized for providing coding procedures as described in "STANDARDIZATION OF GROUP 3 FACSIMILE APPARATUS FOR DOCUMENT TRANSMISSION," CCITT Recommendation T.4 (Geneva, 1980), the disclosure of which is hereby incorporated by reference herein in its entirety. These coding procedures include one-dimensional image coding and two-dimensional image coding.

Whether or not one-dimensional or two-dimensional image coding is utilized is defined by the known CCITT facsimile coding procedures. These CCITT facsimile coding procedures also specify conditions under which various coding modes may be utilized in connection with two-dimensional image coding. If a current scan line alone is used for image coding, the process is referred to as horizontal mode coding. If both a reference scan line and the current scan line are used for image coding, the process is referred to as vertical mode coding.

By way of comparison, the horizontal mode coding technique does not require a reference scan line in connection with coding a scanned line of the image. In contrast, the vertical mode coding technique requires a reference scan line for coding a scanned line of the image as the image data is encoded for transmission at the transmitter. Also, the reference scan line is required by the vertical mode coding technique when the transmitted image data is decoded at the receiver.

Typically, the major cost for operation of known facsimile transmission equipment is the cost for use of the communication link, such as a telephone line. The cost for the use of the communication link is based on the amount of image data which is communicated.

Preferably, the image data is compressed by means of the known CCITT facsimile data compression coding algorithms utilizing the vertical mode coding technique prior to facsimile transmission. The known vertical mode coding technique utilizes a Delta Modulation scheme, whereby the current scan line to be coded is represented by coding only the changes or differences between the current scan line and the reference scan line and the result or difference data comprises the image data which is transmitted. The purpose of the data compression is to reduce the amount, more particularly, the number of bits, of image data to be transmitted, thereby reducing the operating cost. Presently, the amount of image data to be transmitted is of particular concern in the case of pictorial information.

Known facsimile transmission equipment generally requires that a pictorial image be screened prior to coding and transmitting the image. Screening a pictorial image can be performed in several manners.

Screened pictorial images under a magnifying glass generally comprise either circular or diamond-shaped dots aligned in vertical columns. The size of each circle or diamond, or the density of circles or diamonds, in a given area of the pictorial image varies as a function of the gray scale for the given area.

Unfortunately, if a screened pictorial image is to be transmitted, the known vertical mode coding technique does not operate well, because this technique cannot optimally utilize the typical Delta Modulation scheme which is employed. Invariably, the typical Delta Modulation scheme for compressing the current scan line to be coded uses the immediately preceding scan line as the reference scan line, and the current scan line to be coded is represented by coding only the changes or differences between the current scan line to be coded and this immediately preceding scan line. However, the differences between the current scan line to be coded and the immediately preceding scan line can be great. Consequently, the amount of image data to be transmitted over the communication link can be substantial.

Typically, the amount of image data transmitted is not presently reduced by any other technique. This translates to a high cost for operation of the facsimile transmission equipment, since the cost for the use of the communication link is determined by the amount of image data communicated.

SUMMARY OF THE INVENTION

This invention provides a method and apparatus for improving data compression processes utilized in connection with two-dimensional image coding. The method and apparatus of the invention block code sequences or runs of vertical mode codes produced by these processes.

The block coding method and apparatus in accordance with the invention provide improved data compression of image data associated with storage or transmission of an image. In the exemplary case of facsimile transmission utilizing the known CCITT facsimile data compression coding algorithms in accordance with the specifications described in "STANDARDIZATION OF GROUP 3 FACSIMILE APPARATUS FOR DOCUMENT TRANSMISSION," CCITT Recommendation T.4 (Geneva, 1980), block coding in accordance with the method and apparatus of the invention allows enhanced data compression of image data vis-a-vis utilizing the known vertical mode coding technique alone, and, consequently, the cost for use of the communication link is reduced.

The invention relates to a determination of whether or not a block code is used in connection with the storage or transmission of image data for a scan line in conjunction with vertical mode coding. If a determination is made to use a block code, a preselected block code is included in the image data in lieu of a multiplicity of vertical mode codes. Preferably, a block code replaces a predetermined sequence or run of a given vertical mode code. Data compression processes, such as in accordance with the vertical mode coding technique utilized by the CCITT facsimile data compression coding algorithms or similar processes, are enhanced by representing a multiplicity of vertical mode code words with a single block code word. The horizontal mode coding technique, on the other hand, is unaffected.

In accordance with one embodiment of the invention, block coding is provided based fundamentally on detection or recognition of a characteristic reflective of a recurring pattern which can appear in the image represented by the image data to be coded. The recurring pattern present in the image is in turn reflected in the image data coded utilizing vertical mode coding such that a predetermined sequence or run of a given vertical mode code can result. A preselected block code replaces the predetermined run of the given vertical mode code. The block coding method and apparatus in accordance with the invention preferably replace a run of eleven consecutive vertical offset zero code words with a single block code word. The block code stored or transmitted within the image data for the current scan line therefore supplants the run of vertical mode codes for the current scan line and provides enhanced data compression.

In contrast to known facsimile transmission equipment which utilizes the vertical mode coding technique alone, the method and apparatus in accordance with the invention further compress image data for the current scan line by altering a sequence of vertical mode codes using a block code. The key feature of the invention resides in block code selection for the image data representative of the current scan line to be stored or transmitted. The invention lies in the substitution of a block code for the sequence or run of vertical mode codes and how the block code is substituted.

Unlike the known vertical mode coding technique, the method and apparatus in accordance with the invention provide selection of a block code during the process of coding the image data utilizing vertical mode coding. The block code yields enhanced data compression of the image data for the current scan line. The image data for the current scan line, including the block code, are then routed to be stored or transmitted. This reduces the amount of image data stored or transmitted and lowers the cost for operation of the image data storage or facsimile transmission apparatus. The block coding method and apparatus in accordance with the invention provide improved data compression over known CCITT Group 3 and Group 4 facsimile coding.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 is a schematic representation of an image comprised of textual and pictorial information, the pictorial information being represented by pixels of various sizes, the pixels being shown on an enlarged scale;

FIG. 2 is a schematic representation of an image comprised of textual and pictorial information, the pictorial information being represented by pixels arranged in various densities, the pixels being shown on an enlarged scale;

FIG. 8B is a second half of a flow chart of an embodiment of a data compression method in accordance with the invention;

DESCRIPTION OF THE PREFERRED EMBODIMENTS

Figure 3:
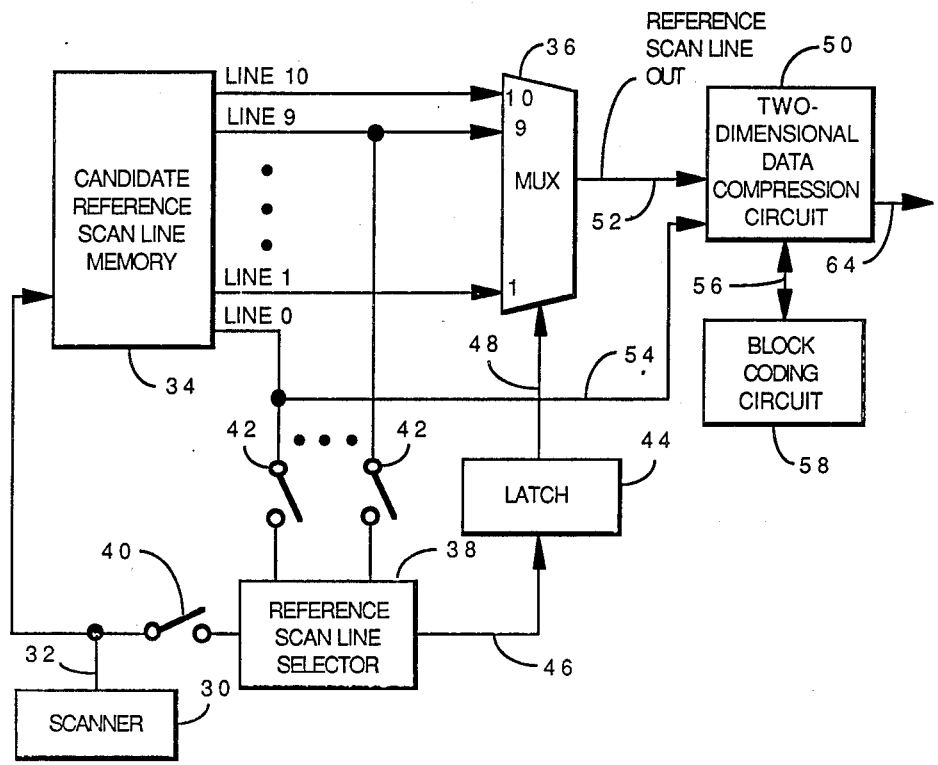
FIG. 3 is a block diagram of an embodiment of data compression apparatus in accordance with the invention.

The method and apparatus in accordance with the invention provide block coding of vertical mode codes in conjunction with a two-dimensional image coding process. Vertical mode coding provides an available initial or first-tier data compression technique that uses a reference scan line in connection with coding a current scan line and applies a Delta Modulation scheme for the purpose of reducing the number of bits of image data stored or transmitted. The block coding method and apparatus in accordance with the invention improve data compression produced as a result of vertical mode coding. The block coding method and apparatus in accordance with the invention provide enhanced or second-tier data compression by preferably detecting a characteristic of the image data reflected in and evidenced by a sequence or run of a given vertical mode code or codes and include a block code in lieu of the run of vertical mode codes. Consequently, a single block code word is substituted for a multiplicity of vertical mode code words, thereby enhancing data compression relative to that produced by vertical mode coding alone. As a result, fewer bits of image data are stored or transmitted, which reduces image data storage and transmission requirements with corresponding reductions in equipment and/or operation costs.

Preferably, the block coding method and apparatus in accordance with the invention substitute a preselected block code for a run of identical vertical mode codes. For example, a preselected block code is preferably substituted for a run of eleven consecutive vertical offset zero codes.

In accordance with the block coding method and apparatus of the invention, the image data are checked during the process of being coded utilizing vertical mode coding for the purpose of determining whether or not block coding is appropriate. In accordance with one embodiment, the image data being subjected to the vertical mode coding technique is checked for a characteristic representative of a predetermined sequence or run of a given vertical mode code or codes. For example, the image data can be checked for the presence of transitions in the bits of image data, which evidence the presence of a sequence of vertical mode codes, such as a predetermined run of a given vertical mode code, preferably vertical offset zero codes. If a sequence of such vertical mode codes is detected, a block code is substituted for the sequence of vertical mode codes, thereby reducing the number of bits of image data stored or transmitted. Alternatively, in accordance with another embodiment, the actual vertical mode codes produced by the vertical mode coding technique and contained in the compressed image data are checked. A preselected block code is then substituted when a sequence or run of vertical mode codes, such as a predetermined run of a given vertical mode code, is detected. In either case, substantially greater compression of the image data is achieved when the block coding method and apparatus in accordance with the invention are used. Since the amount of image data is reduced, the cost for operation of the storage or facsimile transmission apparatus is lowered.

By way of background, an image can generally include two basic categories of information, namely, textual information and/or pictorial information. The case in which both textual information and pictorial information appear on a page of a document is shown in FIGS. 1 and 2.

As shown in FIG. 1, textual information is generally indicated by the numeral 10. Pictorial information is generally indicated by the numeral 12. For the purpose of description, the pictorial information 12 is shown greatly magnified relative to the textual information 10. This magnification shows that the pictorial information 12 is represented in a screened form such that the pictorial information comprises an array of diamond-shaped picture elements or pixels 14. The pictorial information 12 is screened or formatted so that variation of the size of the pixels 14 determines the shade of the various portions of the pictorial information. The shade of the portion of the pictorial information 12 contained within the dotted lines 16, for example, appears darker than the portion of the pictorial information contained within the dotted lines 18, for example. The pixels 14 can be monochrome as shown in FIG. 1, as well as multicolor in the case of polychrome pictorial information 12.

As shown in FIG. 2, the pictorial information 12 is again shown greatly magnified relative to the textual information 10. This magnification shows that the pictorial information 12 is represented in a screened form such that the pictorial information again comprises an array of diamond-shaped picture elements or pixels 14. However, the pictorial information 12 is screened or formatted so that variation of the density of the pixels 14 determines the shade of the various portions of the pictorial information. The shade of the portion of the pictorial information 12 contained within the dotted lines 16', for example, appears darker than the portion of the pictorial information contained within the dotted lines 18', for example. As in the case of FIG. 1, the pixels 14 can be monochrome, as well as multicolor in the case of polychrome pictorial information 12.

While the variation in size or density of the pixels 14 corresponds to variation in the shade of the pictorial information 12, by way of comparison, the textual information 10 is typically defined fully without the need for variation of shade. Consequently, the textual information 10 is not typically screened as in the case of the pictorial information 12. The textual information 10 can be designated as characters 20, as compared to the pixels 14 in the case of the pictorial information 12.

In order for an image such as the textual information 10 and the pictorial information 12 shown in FIGS. 1 and 2 to be coded for storage and/or facsimile transmission, the image is initially scanned. The number of scan positions or points 22 of the image to be coded can vary. Generally, however, the size of the pixels 14 exceeds the size of the scan points 22 or the frequency of the scan points exceeds the number of pixels by at least a ratio of eight to one in order that the pictorial information 12 can be faithfully reproduced. For example, the frequency of scan points 22 in a first direction 24, such as the horizontal direction, as well as a second direction 26, such as the vertical direction, can be 400 per inch, more particularly, 400 scan points per inch across the page of the document in the horizontal direction by 400 scan points per inch in the vertical direction.

Typically, the textual information 10 and the pictorial information 12 can be scanned by a raster scan which begins at a scan point 22 located at a position $P_{H1,V1}$ and scans in the horizontal direction 24 across the image to be coded to and including a scan point located at a position $P_{H1,VN}$, as shown in FIGS. 1 and 2. In the case of an international size document on size A4 paper, for example, there can be 4,768 scan points 22 across the page of the document. Thereafter, the scan continues with a scan point 22 located at a position $P_{H2,V1}$ across to and including a scan point located at a position $P_{H2,VN}$, and so on, until the entire page of the document is scanned including the scan point located at the position $P_{HM,VN}$. For the purpose of explanation, the arrays of scan points 22 located at positions $P_{H1,V1}, P_{H1,V2}, \ldots, P_{H1,VN}$, etc., in the horizontal direction 24 are referred to as scan lines, and the arrays of scan points located at positions $P_{H1,V1}, P_{H2,V1}, \ldots, P_{HM,V1}$, etc., in the vertical direction 26 are referred to as columns. By way of shorthand notation, the line of scan points 22 located at positions $P_{H1,V1}, P_{H1,V2}, \ldots, P_{H1,VN}$ is designated scan line $l_1$; the line of scan points located at positions $P_{H2,V1}, P_{H2,V2}, \ldots, P_{H2,VN}$ is designated scan line $l_2$; and so on, with the last line of scan points located at positions $P_{HM,V1}, P_{HM,V2}, \ldots, P_{HM,VN}$ being designated as scan line $1_M$.

When the image is scanned, the textual information 10 and the pictorial information 12 are preferably represented in a binary format such that a first logic state, for example, a log logic state or logic zero state, indicates that the particular scan point 22 does not coincide with any portion of a pixel 14 or a character 20. Conversely, a second logic state, for example, a high logic state or logic one state, indicates that the scan point 22 coincides with a portion of a pixel 14 or a portion of a character 20. Consequently, the image data appears as an array of first and second logic states which constitute the image data for the lines $1_1, 1_2, \ldots, 1_M$.

FIG. 3 is a block diagram of one embodiment of data compression apparatus including means for block coding in accordance with the invention, the apparatus being generally indicated by the numeral 28. In the embodiment of the block coding apparatus 28 shown in FIG. 3, a scanner 30 is utilized for scanning the image to be coded. The scanner 30 is preferably a charge coupled device (CCD). Preferably, the scanner 30 is a component of the Canon Laser Copier System (Part No. SSF-J7605) manufactured by Canon, Inc. of Japan. The scanner 30 preferably scans 400 scan points per inch in the horizontal direction 24 across the image by 400 lines per inch in the vertical direction 26.

In the case that the image is pictorial information, such as an illustration or photograph, the image to be coded is either already screened, or the scanner 30 includes a feature which performs the screening process. The Canon scanner can digitally screen a pictorial image. The image to be coded, however, does not need to be screened, for example, the textual information 10 need not be screened.

The block coding method and apparatus in accordance with the invention are particularly advantageous in conjunction with the improved reference scan line selection method and apparatus associated with two-dimensional coding disclosed in a co-pending patent application of Lawrence G. Roberts and Alex E. Henderson, U.S. Ser. No. 06/749,606, filed on June 27, 1985, entitled "METHOD AND APPARATUS FOR SELECTION OF A CODING REFERENCE LINE FOR TWO-DIMENSIONAL CODING OF IMAGE DATA REPRESENTING SCREENED IMAGES", now U.S. Pat. No. 4,729,034, issued Mar. 1, 1988, and assigned to the same assignee as this application, the disclosure of which is hereby incorporated by reference herein in its entirety. As disclosed in U.S. Ser. No. 06/749,606, in one embodiment, the reference scan line can be a scan line which is a predetermined number of scan lines earlier than the current scan line to be coded and, further, can preferably be other than the scan line immediately preceding the current scan line to be coded. Alternatively, in another embodiment, the reference scan line can be adaptively selected based on a check of a predetermined number of previous scan lines. Preferably, the ten immediately preceding scan lines are checked. The previous scan line which most closely matches the current scan line to be coded is used as the reference scan line for coding the current scan line.

Additionally, as disclosed in U.S. Ser. No. 06/749,606, the preselected reference scan line, or the most closely matched previous scan line, together with the current scan line to be coded are then fed to a two-dimensional image coding process, such as the CCITT facsimile data compression coding algorithms utilizing the vertical mode coding technique. The resulting differences between the current scan line to be coded and the previous scan line used as the reference scan line are typically minimal. Consequently, when the current scan line to be coded is represented by coding only the changes or differences between the current scan line and the reference scan line by means of Delta Modulation, the difference data are minimal. As a result, the two-dimensional data compression coding algorithms, for example, the known CCITT facsimile data compression coding algorithms, produce optimum vertical mode codes.

Accordingly, the image data scanned by the scanner 30 are fed to a bus 32. The bus 32 connects the scanner 30 to a memory 34 coupled to a multiplexer circuit 36. Preferably, the image data for a plurality of candidate reference scan lines are stored in the memory 34.

The block coding apparatus 28 shown in FIG. 3 includes a reference scan line selector circuit 38. The reference scan line selector circuit 38 selects the candidate reference scan line stored in the memory 34 for use as the reference scan line for the current scan line to be coded.

In accordance with the known vertical mode coding technique, the immediately preceding scan line is used as the reference scan line for the current scan line to be coded. For example, referring again briefly to FIGS. 1 and 2, the scan line $1_1$ is used as the reference scan line when the scan line $1_2$ is coded, the scan line $1_2$ is used as the reference scan line when the scan line $1_3$ is coded, and so on. The difference between the two adjacent scan lines used by the known vertical mode coding technique, however, can be great. For example, the difference between the image data for the scan line $1_U$ and the image data for the scan line $1_V$ is significant, as is the difference between the image data for the scan line $1_V$ and the image data for the scan line $1_W$, as is the difference between the image data for the scan line $1_X$ and the image data for the scan line $1_Y$, as is the difference between the image data for the scan line $1_Y$ and the image data for the scan line $1_Z$, for example.

In accordance with the reference scan line selection method and apparatus disclosed in U.S. Ser. No. 06/749,606, the reference scan line for the current scan line to be coded can be other than the immediately preceding scan line. Therefore, while the difference between the image data for the scan line $1_Z$ and the image data for the scan line $1_Y$ is significant, the image data for the scan line $1_Z$ do not differ significantly from the image data for the scan line $1_V$. Consequently, the scan line $1_V$ is preferably used as the reference scan line for the scan line $1_Z$ to be coded with the result that there is a substantial reduction of the image data in contrast to the known vertical mode coding technique where the scan line $1_Y$ is used as the reference scan line for the scan line $1_Z$ to be coded. The reference scan line selection method and apparatus disclosed in U.S. Ser. No. 06/749,606 respond to the binary coded image data for optimally coding the image data when the two-dimensional coding process, such as the vertical mode coding technique, is utilized for data compression, thereby optimizing the coding metrics.

On the one hand, the reference scan line selector circuit 38 shown in FIG. 3 can be preset based on a determination of the presence of a recurring pattern which can appear in the image represented by the image data to be coded. Accordingly, the reference scan line selector circuit 38 can comprise the reference scan line selector circuit, as indicated by the numeral 33 shown in FIG. 3 of U.S. Pat. No. 4,729,034. As a result, the reference scan line selector circuit 38 can be preset for selecting the candidate reference scan line stored in the memory 34, which is most similar to the current scan line to be coded in view of the recurring pattern. Therefore, if the scan line $l_Z$ is the current scan line to be coded, the candidate reference scan line four lines back, more particularly, the scan line $l_V$, is preset as the reference scan line to be selected.

On the other hand, the reference scan line can be adaptively selected, in which case the scanner 30 is also connected to the reference scan line selector circuit 38 by means of a switchable bus connection 40 and the memory 34 is connected to the reference scan line selector circuit by means of a switchable bus connection 42. Also, the reference scan line selector circuit 38 shown in FIG. 3 can comprise the following combination: the quality estimator circuitry, as indicated by the numeral 34, connected to a quality estimate comparator circuit, as indicated by the numeral 42, via a bus, as indicated by the numeral 40, all shown in FIG. 5, of U.S. Pat. No. 4,729,034. The quality estimator circuitry estimates or determines the quality of the candidate reference scan lines vis-a-vis the current scan line to be coded. This determination can be generally described as ascertaining the similarity between the candidate reference scan line and the current scan line to be coded. In one embodiment, the similarity between the candidate reference scan line and the current scan line to be coded can be based on performing a two-dimensional coding process, such as the vertical mode coding technique described in "STANDARDIZATION OF GROUP 3 FACSIMILE APPARATUS FOR DOCUMENT TRANSMISSION," CCITT Recommendation T.4 (Geneva, 1980). Generally, the vertical mode coding technique determines the differences between the scanned image data for the current scan line to be coded with respect to the image data for a reference scan line and, more particularly, each candidate reference scan line, and produces a similarity code or signal having one or more bits. Alternatively, the quality estimator circuitry can comprise gate array circuitry for performing an exclusive-OR combination of the image data for the current scan line to be coded with the image data for each candidate reference scan line in order to ascertain the similarity between the current scan line and each candidate reference scan line. The number of differences is indicated by the number of second logic state signals which appear as a result of the exclusive-OR combination of the image data for the current scan line to be coded with the image data for the candidate reference scan line, which forms a similarity code or signal having one or more bits. Then, the quality estimate comparator circuit determines from the similarity signals produced by the quality estimator circuitry the candidate reference scan line $l_1, l_2, \ldots, l_K$, which is most similar to the current scan line to be coded, and selects the most similar candidate reference scan line as the reference scan line to be used in connection with vertical mode coding of the current scan line.

The reference scan line selection method and apparatus disclosed in U.S. Ser. No. 06/749,606 can produce a high frequency of runs of identical resultant vertical mode codes. Consequently, the block coding method and apparatus in accordance with the invention are preferably used in connection with the reference scan line selection method and apparatus disclosed in U.S. Ser. No. 06/749,606, although the block coding method and apparatus in accordance with the invention can be used in connection with the known two-dimensional coding process or any other two-dimensional coding process.

As shown in FIG. 3, the reference scan line selector circuit 38 is connected to a latch circuit 44 via a bus 46. The latch circuit 44 is connected to the multiplexer circuit 36 via a bus 48. The reference scan line selector circuit 38 enables a given latch included in the latch circuit 44, which corresponds to the latch that controls gating of the image data for the selected candidate reference scan line from the memory 34 via the multiplexer circuit 36 to a two-dimensional data compression circuit 50 via a bus 52. The current scan line to be coded is fed to the two-dimensional data compression circuit 50 via a bus 54 for coding while the reference scan line for the next scan line to be coded is being selected.

Generally, a recurring pattern, which can appear in the image represented by the image data to be coded, is in turn reflected in the image data coded utilizing vertical mode coding. More particularly, the recurring pattern in the image establishes a pattern relationship between the reference scan line and the current scan line, which is reflected in the resultant vertical mode codes produced by the vertical mode coding technique. The result is a high frequency of identical vertical mode codes in the image data coded utilizing vertical mode coding.

The block coding method and apparatus in accordance with the invention preferably check the image data during the process of being coded utilizing the vertical mode coding technique for a characteristic which causes a predetermined sequence or run of a given vertical mode code to appear. In the embodiment shown in FIG. 3, the two-dimensional data compression circuit 50 is preferably associated with, and connected by a bus 56 to, a block coding means or circuit 58 for checking the image data for the presence of transitions in the bits of image data determinative of a given vertical mode code, such as a vertical offset zero or V(0) code. If transitions are detected, which will precipitate a run of the given vertical mode code, a block code is included in the image data in lieu of the multiplicity of such vertical mode codes, thereby reducing the number or bits of image data stored or transmitted. Preferably, the block coding circuit 58 supplants a run of eleven consecutive V(0) code words with a single block code word. The block codes produced by the block coding circuit 58 can be fixed length or variable length (Huffman coded). The coded image data for the current scan line including any appropriate block code appear on a bus 60.

The block coding circuit 58 preferably substitutes a block code in response to the detection of transitions in the bits of image data determinative of a run of a given vertical mode code, which arises due to the presence of a recurring pattern that can appear in the image represented by the image data to be coded. The appearance of recurring patterns in the image data to be coded originates from the format for the characters 20 in the case of the textual information 10 and the size and shape of the pixels 14 in the case of the pictorial information 12 which has been screened.

Referring again briefly to FIGS. 1 and 2, the similarity between the scan line $l_V$ and the scan line $l_Z$ can be seen to be due in part to the symmetrical configuration of the diamond-shaped pixels 14 which comprise the screened pictorial information 12. Interestingly, the configuration of the pixels 14 which comprise the pictorial information 12 that has been screened contributes to the difference between the scan line $l_V$ and the more proximal scan lines $l_W$, $l_X$, and $l_Y$. The recurrence of a pattern present in the resultant image data produced in connection with the scan line $l_V$ and the scan line $l_Z$ based on the shape of the pixels 14 is one factor which has significant impact on how the transitions in the bits of image data determinative of the run of a given vertical mode code arise, which are detected by the block coding circuit 58.

Another important factor in how the transitions in the bits of image data determinative of the run of a given vertical mode code arise, which are detected by the block coding circuit 58, results from the particular size or frequency of the pixels 14 which comprise the screened pictorial information 12. As described above, the scanner 30 shown in FIG. 3 is selectively operated for screening an image to be coded. However, the image can be pre-screened. The recurrence of a pattern present in the resultant image data produced in connection with the scan line $l_V$ and the scan line $l_Z$ can be seen to be due in part to the result of how the pictorial information 12 is screened by the scanner 30 in the case where the scanner screens the pictorial information or, alternatively, based on the screening size of pre-screened pictorial information which appears in the image to be coded.

In summary, the transitions in the bits of image data determinative of the run of a given vertical mode code are dependent on a recurring pattern present in the image represented by the image data to be coded based on the symmetry of the pixels 14 which comprise the screened pictorial information 12, as well as the size or frequency of the pixels in light of the particular manner in which the pictorial information is screened. This recurring pattern is clearly indicated in FIGS. 1 and 2 by comparison of the scan line $l_V$ with the scan line $l_Z$. This produces transitions in the bits of image data determinative of the run of a given vertical mode code, which are detected in conjunction with block coding.

Before proceeding with consideration of an embodiment of the block coding method and apparatus in accordance with the invention, further information about vertical mode coding will be helpful to an understanding of the features and advantages of the invention. Vertical mode codes are produced in connection with two-dimensional coding. There are various instances, however, in which vertical mode coding is inappropriate, such as in the case of the initial scan line, where no reference scan line is available, or in other circumstances dictated by two-dimensional image coding. Consequently, a comprehension of one-dimensional image coding, which is utilized when two-dimensional image coding is not appropriate, is instructive.

On the one hand, the one-dimensional run length coding scheme for facsimile transmission described in "STANDARDIZATION OF GROUP 3 FACSIMILE APPARATUS FOR DOCUMENT TRANSMISSION," CCITT Recommendation T.4 (Geneva, 1980), is as follows. Coded image data for a scan line comprise a series of variable length code words. Each code word represents a run length of scan points 22 of either all white or all black. White runs and black runs alternate as determined by the image.

In order to ensure that the receiver maintains "color" (i.e., black or white) synchronization, all image data for scan lines begin with a white run length code word. If the actual scan line begins with a black run, a white run length of zero is transmitted. Black or white run lengths, up to a miximum length of one scan line, are defined by the code words in Tables 1/T.4 and 2/T.4 on pages 224–225 of "STANDARDIZATION OF GROUP 3 FACSIMILE APPARATUS FOR DOCUMENT TRANSMISSION," CCITT Recommendation T.4 (Geneva, 1980). The code words are of two types: terminating code words and make-up code words. Each run length is represented by either one terminating code word or one make-up code word followed by a terminating code word.

Run lengths in the range of zero to 63 pixels are encoded with their appropriate terminating code word. There is a different list of code words for black and white run lengths.

Run lengths in the range of 64 to the maximum length of one scan line are encoded first by the make-up code word representing the run length which is equal to or shorter than that required. This is then followed by the terminating code word representing the difference between the required run length and the run length represented by the make-up code word.

An end-of line (EOL) code word follows the image data for each scan line. EOL is a unique code word that is not found within valid image data for the scan line; therefore, resynchronization after an error burst is possible. In addition, this signal will occur prior to the image data for the initial scan line of a page. The end of a document transmission is indicated by sending six consecutive EOLs which comprise a return to control (RTC).

A pause can be placed in the message flow by transmitting fill. Fill can be inserted between a line of image data and an EOL, but not within image data for a scan line. Fill is added to ensure that the transmission time of image data, fill, and EOL is not less than the minimum transmission time of the total coded scan line established in the pre-message control procedure. The format for fill is a variable length string of zeroes.

On the other hand, the two-dimensional coding scheme is an optional extension of one-dimensional image coding described above. For two-dimensional image coding, the total coded scan line is defined as the sum of image data bits plus fill bits plus the EOL bits plus a tag bit. The two-dimensional coding scheme described in "STANDARDIZATION OF GROUP 3 FACSIMILE APPARATUS FOR DOCUMENT TRANSMISSION," CCITT Recommendation T.4 (Geneva, 1980), is as follows.

As described earlier, two-dimensional image coding is a line-by-line coding procedure in which the position of each changing element on the current scan line or coding line is coded with respect to the position of a corresponding reference element situated on either the coding line or a reference scan line which lies above the coding line. After the coding line has been coded, it can become the reference scan line for a subsequent coding line.

Figure 4:
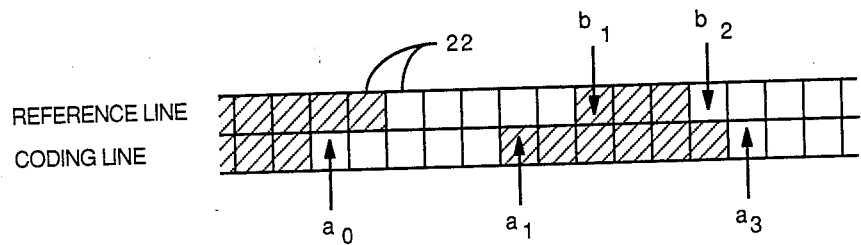
FIG. 4 is a schematic representation of a portion of the image shown in FIG. 1 or 2 for the purpose of defining terminology used in describing the data compression method in accordance with the invention.

A changing element is defined as a scan point 22 whose color (i.e., black or white) is different from that of the previous scan point along the same scan line. With reference to FIG. 4, the following definitions are applicable:

$a_0$ The reference or starting changing element on the current scan line or coding line. At the start of the coding line, $a_0$ is set on an imaginary white changing element situated just before the first scan point 22 on the line. During the coding of the coding line, the position of $a_0$ is defined by the previous coding mode.

$a_1$ The next changing element to the right of $a_0$ on the coding line.

$a_2$ The next changing element to the right of $a_1$ on the coding line.

$b_1$ The first changing element on the reference line to the right of $a_0$ and of opposite color to $a_0$.

$b_2$ The next changing element to the right of $b_1$ on the reference line.

One of three coding modes is chosen in conjunction with two-dimensional image coding to code the position of each changing element along the coding line. Examples of the three coding modes are given in conjunction with FIGS. 5 and 6.

Figure 5:
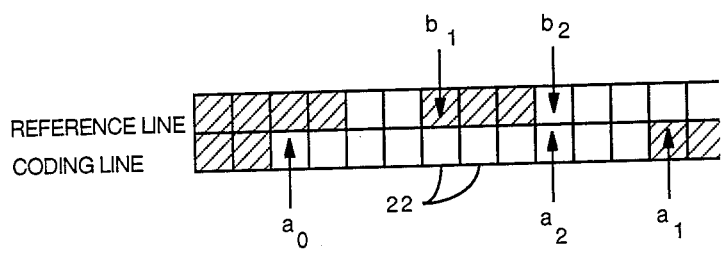
FIG. 5 is a schematic representation of a portion of the image shown in FIG. 1 or 2 for the purpose of defining a pass mode utilized in coding image data according to the protocol defined in connection with FIG. 4.

Pass mode is identified when the position of $b_2$ lies to the left of the position of $a_1$, as shown in FIG. 5. When this mode has been coded, $a_0$ is set on the scan point 22 of the coding line below $b_2$ in preparation for the next coding (i.e., on $a'_0$).

Figure 6:
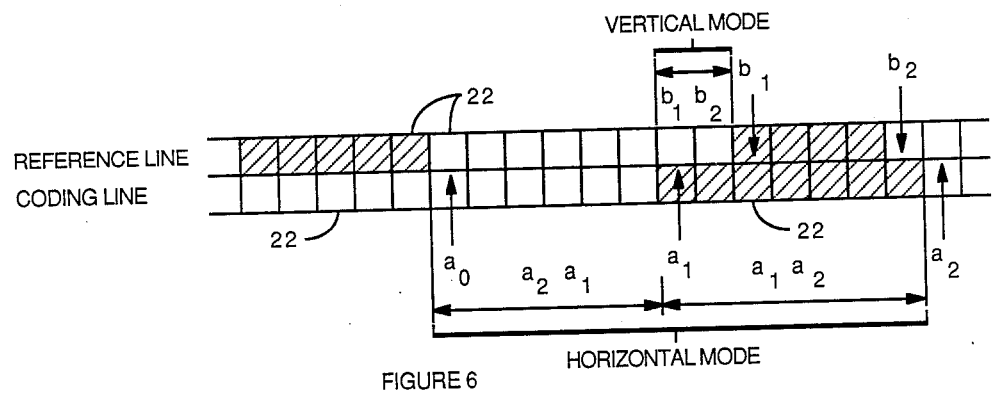
FIG. 6 is a schematic representation of a portion of the image shown in FIG. 1 or 2 for the purpose of defining horizontal and vertical modes utilized in coding image data according to the protocol defined in connection with FIG. 4.

With reference to FIG. 6, when horizontal mode is identified, both the run lengths $a_0a_1$ and $a_1a_2$ are coded using code words $H+M(a_0a_1)+M(a_1a_2)$. H is the flag code word 001 taken from the two-dimensional code table (Table I) below. $M(a_0a_1)$ and $M(a_1a_2)$ are code words which represent the length and color of the runs $a_0a_1$ and $a_1a_2$, respectively, and are taken from the appropriate white and black one-dimensional code tables, namely, Tables 1/T.4 and 2/T.4 on pages 224–225 of "STANDARDIZATION OF GROUP 3 FACSIMILE APPARATUS FOR DOCUMENT TRANSMISSION," CCITT Recommendation T.4 (Geneva, 1980). After a horizontal mode coding, the position of $a_0$ is set on the position of $a_2$.

Still referring to FIG. 6, when the vertical mode is identified, the position of $a_1$ is coded relative to the position of $b_1$. The relative distance $a_1b_1$ can be one of seven values, $V(0)$, $V_R(1)$, $V_R(2)$, $V_R(3)$ $V_L(1)$, $V_L(2)$, or $V_L(3)$, each of which is represented by a separate code word. The subscripts R and L indicate that $a_1$ is to the right or left, respectively, of $b_1$, and the number in parentheses indicates the value of the distance $a_1b_1$. After vertical mode coding has occurred, the position of $a_0$ is set on the position of $a_1$.

The coding procedures identify the coding mode that is to be used to code each changing element along the coding line. When one of the three coding modes has been identified according to the generalized procedure identified by Step 1 or Step 2 described below, an appropriate code word is selected from the code table given in Table I below.

Step 1—If a pass mode is identified, this is coded using the word 0001 (Table I below). After this processing, $a'_0$ just under $b_2$ is regarded as the new starting element $a_0$ for the next coding. (See FIG. 5.) If a pass mode is not detected, the procedure is specified by Step 2 immediately below.

Step 2—Determine the absolute value of the relative distance $a_1b_1$.

If on the one hand $a_1b_1 \leq 3$, $a_1b_1$ is coded by the vertical mode in accordance with Table I below, after which position $a_1$ is regarded as the new starting element $a_0$ for the next coding.

If on the other hand $a_1b_1 > 3$, following horizontal mode code 001, $a_0a_1$ and $a_1a_2$ are respectively coded by one-dimensional image coding in accordance with Table I below. After this processing, $a_2$ is regarded as the new starting element $a_0$ for the next coding.

The first starting element $a_0$ on each coding line is imaginarily set at a position just before the first scan point 22 and is regarded as a white element. Also, the first run length on a line $a_0a_1$ is replaced by $a_0a_1 - 1$.

The coding of the coding line continues until the position of the imaginary changing element situated just after the last actual scan point 22 has been coded. This can be coded as $a_1$ or $a_2$. Also, if $b_1$ and/or $b_2$ are not detected at any time during the coding of the coding line, they are positioned on the imaginary changing element situated just after the last actual scan point 22 on the reference scan line. In order to limit the disturbed area in the event of transmission errors, after each scan line coded one-dimensionally, at most $(J-1)$ successive lines are coded two-dimensionally.

TABLE I

| | Two-Dimensional Code Table | | |
|---|---|---|---|
| Mode | Elements To Be Coded | Notation | Code Word |
| Pass | $b_1$, $b_2$ | P | 0001 |
| Horizontal | $a_0a_1$, $a_1a_2$ | H | 001 + $M(a_0a_1)$ + $M(a_1a_2)$* |
| Vertical | $a_1$ just under $b_1$ $a_1$ to the right of $b_1$ | $a_1b_1 = 0$ | $V(0)$ | 1 |
| | | $a_1b_1 = 1$ | $V_R(1)$ | 011 |
| | | $a_1b_1 = 2$ | $V_R(2)$ | 000011 |
| | | $a_1b_1 = 3$ | $V_R(3)$ | 0000011 |
| | $a_1$ to the left of $b_1$ | | | |
| | | $a_1b_1 = 1$ | $V_L(1)$ | 010 |
| | | $a_1b_1 = 2$ | $V_L(2)$ | 000010 |
| | | $a_1b_1 = 3$ | $V_L(3)$ | 0000010 |

*Code M( ) of the horizontal mode represents the code words in Tables 1/T.4 and 2/T.4 on pages 224–225 of "STANDARDIZATION OF GROUP 3 FACSIMILE APPARATUS FOR DOCUMENT TRANSMISSION," CCITT Recommendation T.4 (Geneva, 1980).

The EOL code word is followed by a single tag bit which indicates whether one- or two-dimensional image coding is used for the next line. EOL plus the tag bit 1 also occur prior to the first line of coded image data of a page. EOL+1 indicates one-dimensional image coding of the next line. EOL+0 indicates two-dimensional image coding of the next line.

In accordance with the known two-dimensional coding scheme, fill is inserted between a line of coded image data and the line synchronization signal, EOL+ tag bit, but is not inserted in the coded image data. The format for fill is a variable length string of zeroes. The RTC format is six consecutive line synchronization code words, i.e., $6 \times (EOL+1)$.

The purpose of utilizing the vertical mode coding technique associated with two-dimensional image coding is to provide data compression, more particularly, to reduce the number of output bits for storage or transmission of image data. This provides a first tier of data compression. The block coding method and apparatus in accordance with the invention detect the presence of transitions in the bits of image data determinative of a sequence or run of vertical mode codes that are to prospectively appear in the compressed image data, such as a run of a given vertical mode code. The presence of transitions in the bits of image data determinative of a predetermined run of a given vertical mode code is attributable to recurrence of a pattern in the image in turn reflected in the image data and the procedure by which the vertical mode codes are produced. Significantly, the presence of transitions in the bits of image data determinative of runs of vertical mode codes in the form of V(0) codes has been found to frequently occur when the reference scan line used to produce the vertical mode codes for the scan line to be coded is selected in accordance with the reference scan line selection method disclosed in U.S. Ser. No. 06/749,606. Based on the statistical rate of occurrence of runs of eleven consecutive V(0) codes, for example, an embodiment of the block coding method and apparatus in accordance with the invention can provide a second tier of data compression by including a single block code word in lieu of a run of eleven consecutive V(0) code words. This yields enhanced data compression and further reduces the amount of image data stored or transmitted relative to utilizing vertical mode coding alone.

Figure 7:
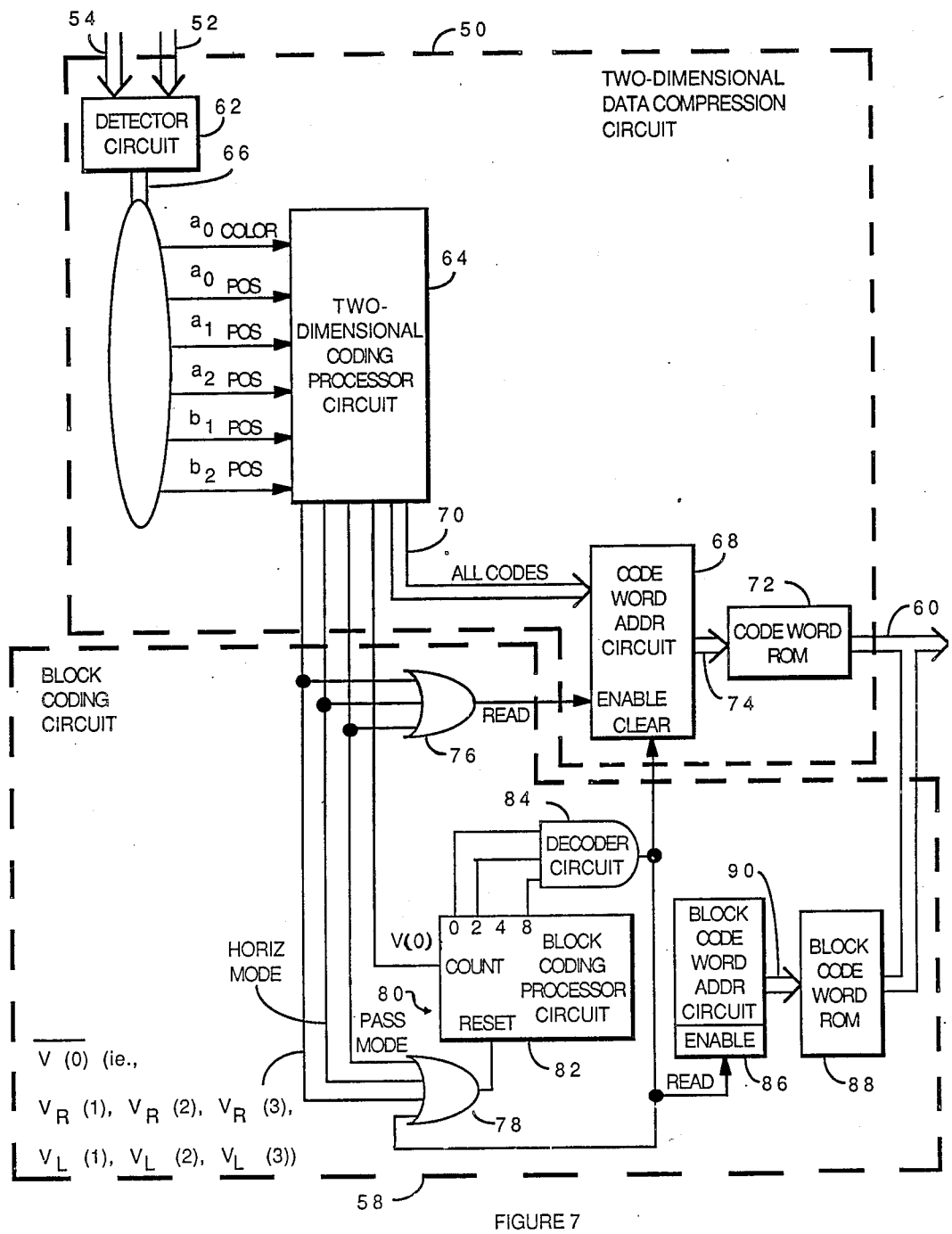
FIG. 7 is a detailed block diagram of an embodiment of block coding means included in the data compression apparatus shown in FIG. 3.

Considered in more detail, one implementation of the block coding circuit 58 for block coding for enhanced compression of image data in accordance with the invention is shown in FIG. 7. The image data for the coding line are fed to the two-dimensional data compression circuit 50 via the bus 54. The image data for the selected reference line are fed to the two-dimensional data compression circuit 50 via the bus 52.

The two-dimensional data compression circuit 50 includes a detector circuit 62. The detector circuit 62 is responsive to the image data for the coding line, which appear on the bus 54, for sensing the color of the changing element $a_0$, as well as the positions of the changing elements $a_0$, $a_1$, and $a_2$. Additionally, the detector circuit 62 is responsive to the image data for the selected reference scan line, which appear on the bus 52, for sensing the positions of the changing elements $b_1$ and $b_2$. The color of the changing element $a_0$ is sensed by detecting the logic state of the bits of image data associated with the changing element located at the $a_0$ position. The positions of the changing elements $a_0$, $a_1$, $a_2$, $b_1$, and $b_2$ are sensed by detecting transitions in the logic states of the bits of image data; more particularly, the positions of the changing elements $a_0$, $a_1$, and $a_2$ are sensed by detecting transitions in the logic states of the bits of image data for the coding line, and the positions of the changing elements $b_1$ and $b_2$ are sensed by detecting transitions in the logic states of the bits of image data for the selected reference scan line with respect to the color and position of the changing element $a_0$ and the position of the changing element $b_1$, respectively.

The two-dimensional data compression circuit 50 also includes a two-dimensional coding processor circuit 64. The detector circuit 62 is connected to the two-dimensional coding processor circuit 64 via a bus 66.

The two-dimensional coding processor circuit 64 is responsive to the detected color of the changing element $a_0$ and the detected transitions in the bits of image data indicative of the positions of the changing elements $a_0$, $a_1$, $a_2$, $b_1$, and $b_2$ for determining the appropriate mode for encoding the coding line. More particularly, the two-dimensional coding processor circuit 64 determines whether two-dimensional image coding utilizes the pass mode, horizontal mode, or vertical mode for encoding the coding line.

The two-dimensional data compression circuit 50 further includes a code word address circuit 68. The code word address circuit 68 is connected to the two-dimensional coding processor circuit 64 via a bus 70.

The code word address circuit 68 is responsive to the codes produced by the two-dimensional coding processor circuit 64 for providing addresses of pass mode, horizontal mode, and vertical mode code words representative of the image data to be stored or transmitted. The code words, for example, can comprise the code words indicated in Table I above.

The two-dimensional data compression circuit 50 finally includes a code word read only memory 72. The code word read only memory 72 is connected to the code word address circuit 68 via a bus 74.

The code word read only memory 72 stores code words representative of the image data to be stored or transmitted. The code word read only memory 72 is responsive to the addresses read from the code word address circuit 68 for providing coded image data on the bus 60.

On the one hand, the two-dimensional data compression circuit 50, insofar as just described, is conventional. Therefore, no independent claim is asserted to the just-described two-dimensional data compression circuit 50.

On the other hand, in accordance with the block coding apparatus of the invention, the block coding circuit 58 is associated with the two-dimensional data compression circuit 50 so as to form a combination for providing improved compression of image data to be stored or transmitted. As shown in FIG. 7, there are various interconnections between the two-dimensional data compression circuit 50 and the block coding circuit 58, as will now be described.

First, the block coding circuit 58 includes a first OR circuit 76. The input of the OR circuit 76 is connected to the two-dimensional coding processor circuit 64. The OR circuit 76 is responsive to signals produced by the two-dimensional coding processor circuit 64 indicative of default conditions in which block coding is not provided. In accordance with the implementation of the block coding apparatus shown in FIG. 7, block coding is not provided in either the pass mode or the horizontal mode and is not provided in the vertical mode in the following cases: $V_R(1)$, $V_R(2)$, $V_R(3)$, $V_L(1)$, $V_L(2)$, or $V_L(3)$.

The output of the OR circuit 76 is connected to the code word address circuit 68. If any of the default conditions appears, the OR circuit 76 causes the addresses selected by the codes produced by the two-dimensional coding processor circuit 64 to be read from the code word address circuit 68 for accessing the code words stored in the code word read only memory 72, and the code words are fed to the bus 60.

Furthermore, the block coding circuit 58 includes a second OR circuit 78. The input of the OR circuit 78 is connected to the two-dimensional coding processor circuit 64. The OR circuit 78 is responsive to signals produced by the two-dimensional coding processor circuit 64 indicative of conditions in which block coding is provided. In accordance with the implementation of the block coding apparatus shown in FIG. 7, block coding is provided in the vertical mode in the case of V(0) codes.

The block coding circuit 58 also includes a block coding processor circuit 80. The block coding processor circuit 80 in turn includes a counter circuit 82. The counter circuit 82 can be a four-bit counter.

On the one hand, the input of the counter circuit 82 is connected to the output of the two-dimensional coding processor circuit 64. The counter circuit 82 is responsive to signals produced by the two-dimensional coding processor circuit 64 representative of detected transitions in the bits of image data determinative of V(0) codes for counting the number of these detected transitions. On the other hand, the reset terminal of the counter circuit 82 is connected to the output of the OR circuit 78. The counter circuit 82 is therefore reset if the two-dimensional coding processor circuit 64 produces a signal determinative of a code other than a V(0) code.

The block coding processor circuit 80 also includes a decoder circuit 84 in the form of an AND circuit. The input of the AND circuit 84 is connected to the output of the counter circuit 82. In accordance with the implementation of the block coding apparatus shown in FIG. 7, block coding is provided on the occurrence of signals produced by the two-dimensional coding processor circuit 64 indicative of detected transitions in the bits of image data determinative of eleven consecutive V(0) codes. Therefore, the "0", "2", and "8" outputs of the counter circuit 82 are connected to the inputs of the AND circuit 84 for providing a signal at the output of the AND circuit when the two-dimensional coding processor circuit 64 produces signals determinative of eleven consecutive V(0) codes.

The block coding circuit 58 further includes a block code word address circuit 86. The block code word address circuit 86 is connected to the output of the AND circuit 84.

The block code word address circuit 86 is responsive to the signals produced by the AND circuit 84 for providing an address of a block code word which comprises a compaction or compression of a multiplicity of vertical code words into a single code word. Therefore, a portion of the coded image data to be stored or transmitted is represented by a single block code word, rather than by a plurality of vertical mode code words.

The block coding circuit 58 finally includes a block code word read only memory 88. The block code word read only memory 88 is connected to the block code word address circuit 86 via a bus 90.

The block code word read only memory 88 stores the block code word representative of the multiplicity of vertical mode code words correlated to the image data to be stored or transmitted. The block code word read only memory 88 is responsive to the addresses read from the block code word address circuit 86 for providing further compacted or compressed, coded image data on the bus 60.

Second, there is an additional interconnection to the two-dimensional data compression circuit 50. The clear terminal of the code word address circuit 68 is connected to the output of the AND circuit 84. The code word address circuit 68 is therefore cleared if the two-dimensional coding processor circuit 64 produces signals determinative of eleven consecutive V(0) codes.

Circumstances can arise in which one to ten consecutive V(0) codes occur between default conditions indicated by pass mode, horizontal mode, vertical mode $V_R(1)$, $V_R(2)$, $V_R(3)$, $V_L(1)$, $V_L(2)$, or $V_L(3)$ codes. Under these circumstances, the V(0) codes are accumulated or buffered in the code word address circuit 68, until the second default condition occurs, as evidenced by a signal produced by the OR circuit 76. Subsequently, the one to ten consecutive V(0) codes are read from the code word address circuit 68 for accessing the V(0) code word stored in the code word read only memory 72 the corresponding number of times, and the V(0) code words are fed to the bus 60. Conversely, if transitions determinative of eleven consecutive V(0) codes occur, the block code is read from the block code word address circuit 86 for accessing the block code word stored in the block code word read only memory, which is fed to the bus 60, and the code word address circuit 68 is cleared.

In accordance with the implementation of the block coding apparatus shown in FIG. 7, the block coding circuit 58 includes a block code word address circuit 86, even though a single block code word is stored in the block code word read only memory 88. Consequently, the block code word address circuit 86 can be eliminated, and the block code word substituted for the eleven consecutive V(0) code words can be stored in a register. The register can be enabled by the signal produced by the AND circuit 84 for substituting a block code for storage or transmission. However, the inclusion of a directly enabled register limits block coding to a single condition.

Additionally, the block coding circuit 58 includes the block code word read only memory 88 which is separate from the code word read only memory 72. The block code word substituted from the eleven consecutive V(0) code words can alternatively be stored in the code word read only memory 72 and addressed by the block code word address circuit 86. However, the retention of the separate block code word read only memory 88 coupled with expansion of the block coding processor circuit 80 and modification of the OR circuits 76 and 78 facilitates extension of the block coding circuit 58 for block coding other sequences of code words, especially other sequences of vertical mode code words including series of identical or mixed vertical mode codes.

Figure 8:
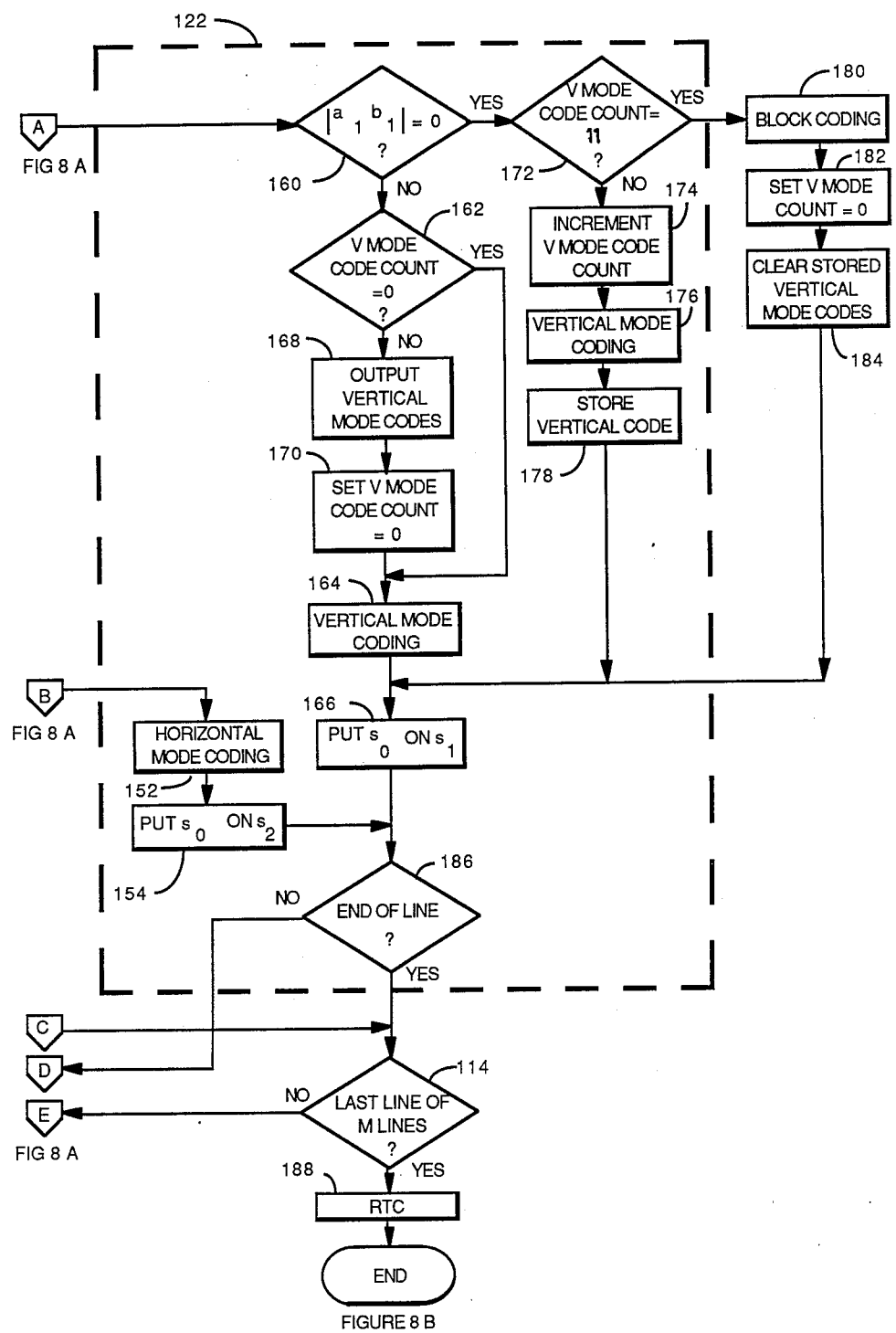
FIG. 8 is a diagram showing the combination of FIGS. 8A and 8B.
Figure 8A:
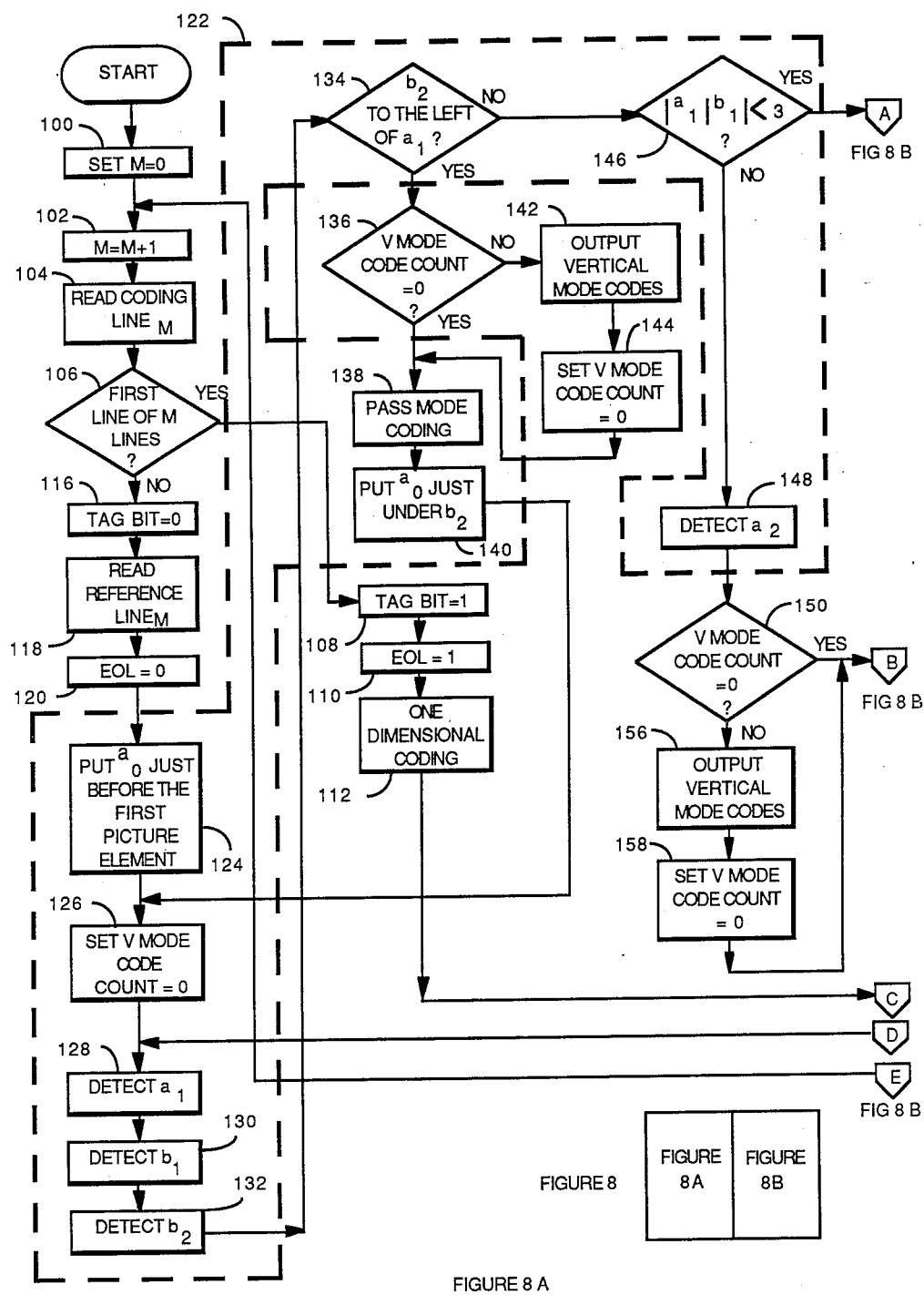
FIG. 8A is a first half of a flow chart of an embodiment of a data compression method in accordance with the invention.

An embodiment of the data compression method including block coding in accordance with the invention is shown in the flow chart of FIG. 8. As shown in FIG. 8, an iterative procedure for two-dimensional image coding of each of the scan lines of an image to be coded, such as the scan lines $l_1, l_2, \ldots l_M$ shown in FIGS. 1 and 2, is undertaken. Initially, an index, denoted M to correspond to the coding line, is set equal to zero, as indicated by the numeral 100. Next, the index M is set equal to (M+1), as indicated by the numeral 102. When the index M is one, an indication is initially provided that the coding line is the first scan line $l_1$. Thereafter, the image data for the coding line, which is initially the scan line $l_1$, are output from the memory 34 on the bus 54, as indicated by the numeral 104.

Then, the index M is checked for the purpose of determining whether or not the coding line is the first scan line of the image, as indicated by the numeral 106. Since the index M is initially one for the purpose of indicating that the coding line is the scan line $l_1$, the tag bit is set equal to one, as indicated by the numeral 108, for the purpose of indicating that the scan line is to be coded using one-dimensional image coding. Subsequently, the tag bit, which is equal to one, is combined with EOL, as indicated by the numeral 110, as the initial portion of the coded image data for storage or transmission. Then, the coding line, which is initially the scan line $l_1$, is coded by the two-dimensional data compression circuit 50 utilizing one-dimensional image coding, as indicated by the numeral 112, and assembled following the EOL plus tag bit, which is initially one, into the coded image data for storage or transmission. Next, the index M is checked for the purpose of determining whether or not the last scan line of the image has been coded, as indicated by the numeral 114.

If the last scan line of the image has not been coded, the index M is set equal to (M+1), as indicated by the numeral 102, and the image data for the next coding line, which is now the scan line $l_2$, are output from the memory 34 on the bus 54, as indicated by the numeral 104. Again, the index M is checked for the purpose of determining whether or not the coding line, which is now the scan line $l_2$, is the first scan line of the image, as indicated by the numeral 106. Since the coding line, which is now the scan line $l_2$, is not the first scan line of the image, the tab bit is set equal to zero, as indicated by the numeral 116, for indicating that the scan line is to be coded using two-dimensional image coding. Thereafter, the selected reference scan line for the coding line is output from the memory 34 via the multiplexer circuit 36 on the bus 52, as indicated by the numeral 118. Then, the tag bit, which is now equal to zero, is combined with EOL, as indicated by the numeral 120, and assembled into the coded image data for storage or transmission.

The two-dimensional data compression circuit 50 is responsive to the image data for the coding line, which is now the scan line $l_2$, as well as the image data for the selected reference scan line, which are processed by the two-dimensional image coding algorithms, such as the known CCITT facsimile data compression coding algorithms, for the purpose of producing two-dimensional mode codes, as indicated by the section of the flow chart shown in FIG. 8 enclosed within the dotted lines 122, as well as block codes when block coding is appropriate. Specifically, as indicated by the numeral 124, $a_0$ is located one position to the left of the initial scan point 22 of the coding line. Also, an index, identified as the VMODE CODE COUNT, is set equal to zero, as indicted by the numeral 126. Next, the detector circuit 62 senses the position of $a_1$, the position of $b_1$, and the position of $b_2$, as indicated by the numerals 128, 130, and 132, respectively.

Then, the two-dimensional coding processor circuit 64 checks the position of $b_2$ for the purpose of determining whether or not $b_2$ is positioned to the left of the position of $a_1$, as indicated by the numeral 134. If the position of $b_2$ is to the left of the position of $a_1$, pass mode coding is initiated. First, however, the VMODE CODE COUNT is checked for the purpose of determining whether or not any vertical mode code, such as a V(0) code, has been previously output from the two-dimensional coding processor circuit 64 and currently resides in the code word address circuit 68, as indicated by the numeral 136. If on the one hand the VMODE CODE COUNT equals zero, the two-dimensional coding processor circuit 64 undertakes pass mode coding, as indicated by the numeral 138, and the pass mode code shown in Table I above is assembled into the coded image data for storage or transmission. Also, $a_0$ is positioned under $b_2$, as indicated by the numeral 140, for the purpose of coding the remainder of the coding line. If on the other hand the VMODE CODE COUNT is non-zero, the vertical mode codes previously buffered in the code word address circuit 68 access the code word read only memory 72 so that the corresponding code words are assembled into the coded inage data for storage or transmission, as indicated by the numeral 142, and the VMODE CODE COUNT is the set equal to zero, as indicated by the numeral 144. Also, the two-dimensional coding processor circuit 64 undertakes pass mode coding so that the pass mode code shown in Table I above is assembled into the image data for storage or transmission, and $a_0$ is positioned under $b_2$ for the purpose of coding the remainder of the coding line, as indicated by the numerals 138 and 140, respectively. Therefore, any previously stored vertical mode codes are assembled into the coded image data for storage or transmission. Also, the pass mode code shown in Table I above is assembled together with these buffered vertical mode codes into the coded image data for storage or transmission.

If image data for the coding line has been coded utilizing pass mode coding, after the position of $a_0$ is located beneath the position of $b_2$, two-dimensional image coding continues with detection of the position of $a_1$, the position of $b_1$, and the position of $b_2$, as indicated by the numerals 128, 130, and 132, respectively. Subsequently, the position of $b_2$ is checked for the purpose of determining whether or not the position of $b_2$ is to the left of the position of $a_1$, as indicated by the numeral 134. If on the one hand the position of $b_2$ is to the left of the position of $a_1$, pass mode coding is again initiated.

If on the other hand the position of $b_2$ is not to the left of the position of $a_1$, pass mode coding is not initiated. Instead, the distance $a_1b_1$ is checked, as indicated by the numeral 146, for the purpose of determining whether or not the distance $a_1b_1$ is less than or equal to three.

If on the one hand the distance $a_1b_1$ is greater than three, the position of $a_2$ is detected, as indicated by the numeral 148. Then, horizontal mode coding of image data for the coding line is initiated. First, however, the VMODE CODE COUNT is checked for the purpose of determining whether or not any vertical mode code has been previously output from the two-dimensional coding processor circuit 64 and currently resides in the code word address circuit 68, as indicated by the numeral 150. If on the one hand the VMODE CODE COUNT equals zero, the two-dimensional coding processor circuit 64 undertakes horizontal mode coding, as indicated by the numeral 152, and a horizontal mode code in accordance with Table I above is assembled into the coded image data for storage or transmission. Also, the position of $a_0$ is set on the of position $a_2$, as indicated by the numeral 154, for the purpose of coding the remainder of the coding line. If on the other hand the VMODE CODE COUNT is non-zero, the vertical mode codes previously buffered in the code word address circuit 68 are assembled into the coded image data for storage or transmission, as indicated by the numeral 156, and the VMODE CODE COUNT is then set equal to zero, as indicated by the numeral 158. Also, the two-dimensional coding processor circuit 64 undertakes horizontal mode coding so that a horizontal mode code in accordance with Table I above is assembled into the image data for storage or transmission, and the position of $a_0$ is set on the position of $a_2$ for the purpose of coding the remainder of the coding line, as indicated by the numerals 152 and 154, respectively. Therefore, any previously stored vertical mode codes are assembled into the coded image data for storage or transmission. Also, the horizontal mode code is determined by the two-dimensional data compression circuit 50 in accordance with Table I above and assembled together with these buffered vertical mode codes into the coded image data for storage or transmission.

If on the other hand the distance $a_1b_1$ is less than or equal to three, the distance $a_1b_1$ is preferably checked for the purpose of determining whether or not this distance is zero, as indicated by the numeral 160. If on the one hand the distance $a_1b_1$ is not zero, vertical mode coding of image data for the coding line is initiated. First, however, the VMODE CODE COUNT is checked for the purpose of determining whether or not any vertical mode code has been previously output from the two-dimensional coding processor circuit 64 and currently resides in the code word address circuit 68, as indicated by the numeral 162. If on the one hand the VMODE CODE COUNT equals zero, the two-dimensional coding processor circuit 64 undertakes vertical mode coding, as indicated by the numeral 164, and a vertical mode code in accordance with Table I above is assembled into the coded image data for storage or transmission. Also, the position of $a_0$ is set on the position of $a_1$, as indicated by the numeral 166, for the purpose of coding the remainder of the coding line. If on the other hand the VMODE CODE COUNT is non-zero, the vertical modes codes previously buffered in the code word address circuit 68 access the code word read only memory 72 so that the corresponding code words are assembled into the coded image data for storage or transmission, as indicated by the numeral 168, and the VMODE CODE COUNT is set equal to zero, as indicated by the numeral 170. Also, the two-dimensional coding processor circuit 64 undertakes vertical mode coding so that a vertical mode code in accordance with Table I above is assembled into the image data for storage or transmission, and the position of $a_0$ is set on the position of $a_1$ for the purpose of coding the remainder of the coding line, as indicated by the numerals 164 and 166, respectively. Therefore, any previously stored vertical mode codes are assembled into the coded image data for storage or transmission. Also, the vertical mode code is determined by the two-dimensional data compression circuit 50 in accordance with Table I above and assembled together with these buffered vertical mode codes into the coded image data for storage or transmission.

If on the other hand the distance $a_1b_1$ equals zero, the VMODE CODE COUNT is checked for the purpose of determining whether or not this count equals a count limit, as indicated by the numeral 172. In the embodiment of the block coding apparatus shown in FIGS. 3 and 7, wherein block coding is employed upon the occurrence of eleven consecutive V(0) codes, the count limit equals eleven.

If on the one hand the count limit has not been reached, the VMODE CODE COUNT is incremented by one, vertical mode coding is initiated, and the resultant V(O) code is stored, as indicated by the numerals 174, 176, and 178, respectively. Thereafter, the position of $a_0$ is set on the position of $a_1$, as indicated by the numeral 166, for the purpose of coding the remainder of the coding line.

If on the other hand the count limit is reached, block coding is initiated, the VMODE CODE COUNT is set equal to zero, and the stored V(0) codes are cleared, as indicated by the numerals 180, 182, and 184, respectively. Consequently, the block code is determined by the block coding circuit 58 and assembled into the coded image data for storage or transmission in lieu of the stored V(0) codes. Thereafter, the position of $a_0$ is set on the position of $a_1$, as indicated by the numeral 166, for the purpose of coding the remainder of the coding line.

After image data for the coding line is coded utilizing pass mode coding, as indicated by the numeral 138, horizontal mode coding, as indicated by the numeral 152, vertical mode coding, as indicated by the numeral 164 or 176, and/or block coding, as indicated by the numeral 180, the image data for the coding line is checked for the purpose of determining whether or not the entire coding line has been coded, as indicated by the numeral 186. If on the one hand the image data for the coding line has not been completed coded, the position of $a_1$, the position of $b_1$, and the position of $b_2$ are detected, as indicated by the numerals 128, 130, and 132, respectively. Thereafter, the position of $b_2$ vis-a-vis the position of $a_1$ is checked, as indicated by the numeral 134, for the purpose of determining whether or not pass mode coding is appropriate. If pass mode coding of the additional image data for the coding line is appropriate, pass mode coding is again initiated, as indicated by the numeral 138. If pass mode coding is not appropriate, the distance $a_1b_1$ is checked, as indicated by the numeral 146, for the purpose of determining whether horizontal mode coding is again initited, as indicated by the numeral 152, or, alternatively, vertical mode coding and/or block coding is initiated, as indicated by the numerals 164 and 176 and/or 180, respectively.

The coding line is then checked to determine whether or not the coding line is the final scan line of the image to be coded, as indicated by the numeral 114. If on the one hand the coding line is not the final scan line of the image to be coded, the index M is set equal to (M+1), as indicated by the numeral 102, and the coding for the next scan line to be coded is determined analogously to the determination described above. If on the other hand the coding line corresponds to the final scan line of the image, an RTC is assembled into the coded image data for storage or transmission, as indicated by the numeral 188, which completes coding of the image.

In summary, in accordance with the just-described embodiment of the block coding method and apparatus of the invention, transitions in the bits of image data are checked during two-dimensional image coding in the vertical mode. Preferably, the transitions in the bits of image data determinative of runs of a given vertical mode code are detected. The transitions in the bits of image data are preferably checked for the presence of transitions determinative of a run of identical vertical mode codes in the form of V(0) codes, more particularly, a run of eleven consecutive V(0) codes. If transitions in the bits of image data determinative of a run of eleven consecutive V(0) codes are detected, the block coding method and apparatus in accordance with the invention insert a single block code word in the image data in lieu of eleven consecutive V(0) code words. This provides enhanced data compression and reduces the number of output bits for image data storage or transmission.

Alternatively, in accordance with another embodiment of the block coding method and apparatus of the invention, the actual vertical mode code words produced during two-dimensional image coding can be checked for the presence of a sequence or run of a given vertical mode code or codes. Preferably, the vertical mode codes are checked for the presence of a predetermined run of a given vertical mode code. In accordance with this alternative embodiment of the block coding method and apparatus for the invention, the vertical mode codes are preferably checked for the presence of a run of identical vertical mode codes in the form of V(0) codes, more particularly, a run of eleven consecutive V(0) codes. If a run of eleven consecutive V(0) codes is recognized, a single block code word is substituted for the sequence of vertial mode code words, more particularly, a single block code word is substituted for the eleven consecutive V(O) code words. This provides enhanced data compression and reduces the number of output bits for image data storage or transmission.

Figure 9:
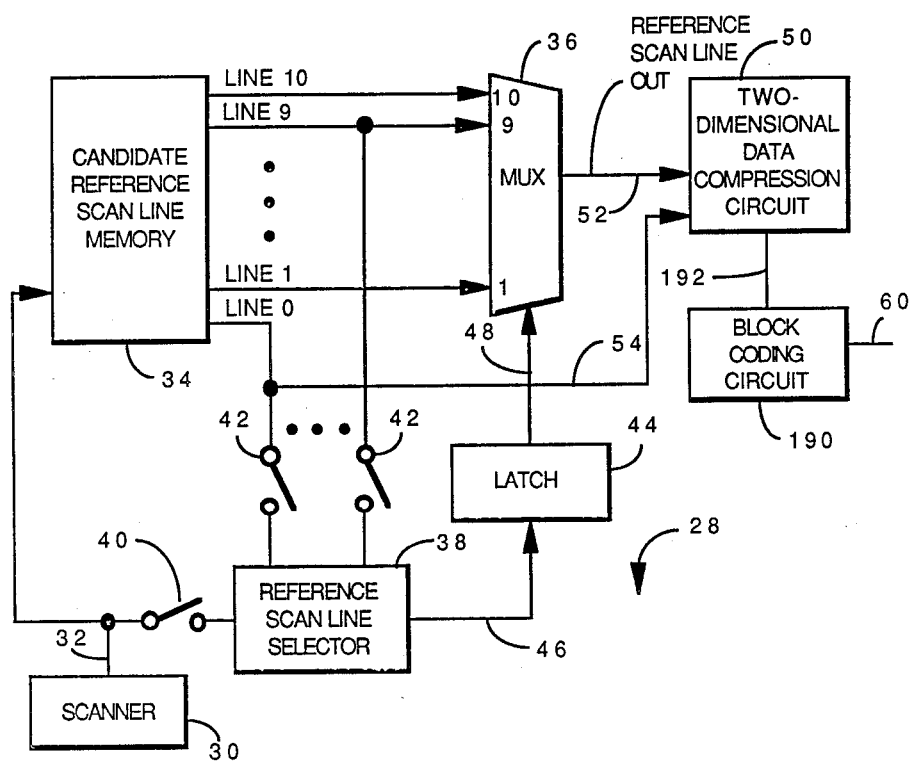
FIG. 9 is a block diagram of another embodiment of data compression apparatus in accordance with the invention.

The alternative embodiment of block coding apparatus in accordance with the invention is shown in FIG. 9. The alternative embodiment of block coding apparatus shown in FIG. 9, generally designated by the numeral 28', is similar to the embodiment of block coding apparatus 28 shown in FIG. 3 described earlier. The same numerals are employed in FIG. 9 as in FIG. 3 for the purpose of identifying identical circuit elements. Unlike the block coding apparatus 28 shown in FIG. 3, however, the block coding appartus 28' shown in FIG. 9 includes a block coding means or circuit 190 connected to the output of the two-dimensional data compression circuit 59 via a bus 192. The block coding circuit 190 comprises gate array circuitry or microprocessor-based circuitry for recognizing the presence of a predetermined sequence or run of vertical mode codes, preferably a run of eleven consecutive V(0) codes, but alternatively other sequences of vertical mode code words including series of identical or mixed vertical mode codes, and substituting a block code word for the multiplicity of vertical mode code words.

The image data for the current image scan line, initially coded based on two-dimensional image coding utilizing the vertical mode coding technique with the reference scan line, are fed to the block coding circuit 190 via the bus 192 for block coding while the reference scan line for the next scan line to be coded is being selected. The block coding circuit 190 block code one or more of the vertical mode codes produced by the two-dimensional data compression circuit 50.

The block coding circuit 190 represents one or more sequences of vertical mode code words with a single block code word. For example, the block coding circuit 190 can be preset for detecting the presence of a run of a given vertical mode code, such as eleven consecutive V(0) code words, and substituting a single block code word. The image data for the block coded current scan line appears on the bus 60.

Figure 10:
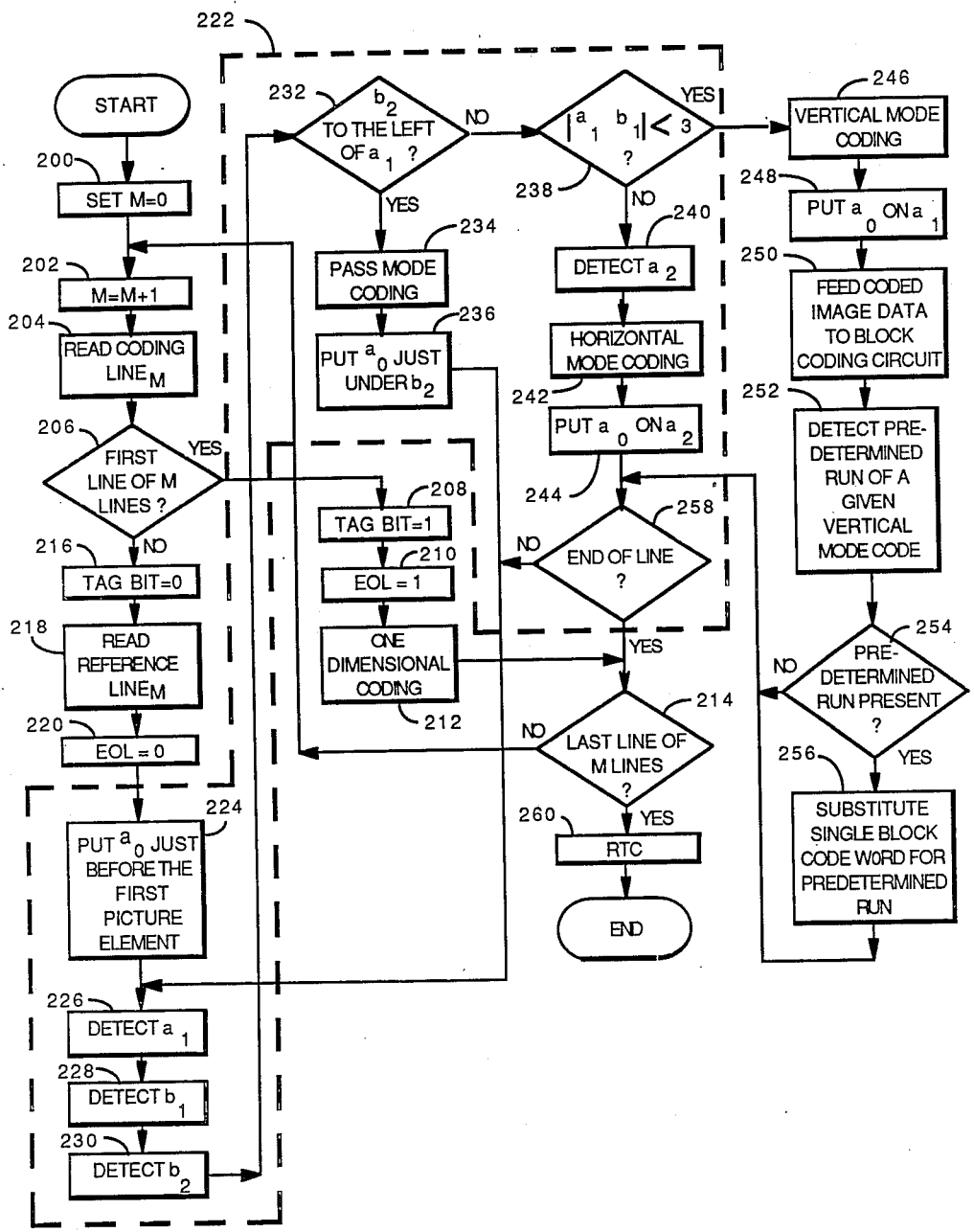
FIG. 10 is a flow chart of another embodiment of data compression method in accordance with the invention.

An alternative embodiment of the data compression method including block coding in accordance with the invention is shown in the flow chart of FIG. 10. As shown in FIG. 10, an iterative procedure for two-dimensional image coding of each of the scan lines of an image to be coded, such as the scan lines $l_1, l_2, \ldots, l_M$ shown in FIGS. 1 and 2, is undertaken. Initially, an index, denoted M to correspond to the coding line, is set equal to zero, as indicated by the numeral 200. Next, the index M is set equal to (M+1), as indicated by the numeral 202. When the index M is one, an indication is initially provided that the coding line is the first scan line $l_1$. Thereafter, the image data for the coding line, which is initially the scan line $l_1$, are output from the memory 34 on the bus 54, as indicated by the numeral 204.

Then, the index M is checked for the purpose of determining whether or not the coding line is the first scan line of the image, as indicated by the numeral 206. Since the index M is initially one for the purpose of indicating that the coding line is the scan line $l_1$, the tag bit is set equal to one, as indicated by the numeral 208, for the purpose of indicating that the scan line is to be coded utilizing one-dimensional image coding. Subsequently, the tag bit, which is equal to one, is combined with EOL, as indicated by the numeral 210, as the initial portion of the coded image data for storage or transmission. Then, the coding line, which is initially the scan line $l_1$, is coded by the two-dimensional data compression circuit 50 utilizing one-dimensional image coding, as indicated by the numeral 212, and assembled following the EOL plug tag bit, which is initially on, into the coded image data for storage or transmission. Next, the index M is checked for the purpose of determining whether or not the last scan line of the image has been coded, as indicated by the numeral 214.

If the last scan line of the image has not been coded, the index M is set equal to (M+1), as indicated by the numeral 202, and the image data for the next coding line, which is now the scan line $l_2$, are output from the memory 34 on the bus 54, as indicated by the numeral 204. Again, the index M is checked for the purpose of determining whether or not the coding line, which is the scan line $l_2$, is the first scan line of the image, as indicated by the numeral 206. Since the coding line, which is now the scan line $l_2$, is not the first scan line of the image, the tag bit is set equal to zero, as indicated by the numeral 216, for indicating that the scan line is to be coded utilizing two-dimensional image coding. Thereafter, the selected reference scan line for the coding line is output from the memory 34 via the multiplexer circuit 36 on the bus 52, as indicated by the numeral 218. Then, the tag bit, which is now equal to zero, is combined with EOL, as indicated by the numeral 220, and assembled into the coded image data for storage or transmission.

The two-dimensional data compression circuit 50 is responsive to the image data for the coding line, which is now the scan line $l_2$, as well as the image data for the selected reference scan line, which are processed by the two-dimensional image coding algorithms, such as the known CCITT facsimile data compression coding algorithms, for the purpose of producing two-dimensional mode codes, as indicated by the section of the flow chart shown in FIG. 10 enclosed within the dotted lines 222, as well as block codes when block coding is appropriate. Specifically, as indicated by the numeral 224, $a_0$ is located one position to the left of the initial scan point 22 of the coding line. Next, the position of $a_1$, the position of $b_1$, and the position of $b_2$ are detected, as indicated by the numerals 226, 228, and 230, respectively.

Then, the position of $b_2$ is checked for the purpose of determining whether or not $b_2$ is positioned to the left of the position of $a_1$, as indicated by the numeral 232. If the position of $b_2$ is to the left of the position of $a_1$, pass mode coding is initiated, as indicated by the numeral 234. Consequently, the pass mode code shown in Table I above is assembled into the coded image data for storage or transmission. Also, $a_0$ is positioned under $b_2$, as indicated by the numeral 236, for the purpose of coding the remainder of the coding line.

If image data for the coding line has been coded utilizing pass mode coding, after the position of $a_0$ is located beneath the position of $b_2$, two-dimensional image coding continues with detection of the position of $a_1$, the position of $b_1$, and the position of $b_2$, as indicated by the numerals 226, 228, and 230, respectively. Subsequently, the position of $b_2$ is checked for the purpose of determining whether or not the position of $b_2$ is to the left of the position of $a_1$, as indicated by the numeral 232. If on the one hand the position of $b_2$ is to the left of the position of $a_1$, pass mode coding is again initiated.

If on the other hand the position of $b_2$ is not to the left of the position of $a_1$, pass mode coding is not initiated. Instead, the distance $a_1b_1$ is checked, as indicated by the numeral 238, for the purpose of determining whether or not the distance $a_1b_1$ is less than or equal to three.

If on the one hand the distance $a_1b_1$ is greater than three, the position of $a_2$ is detected as indicated by the numeral 240, and horizontal mode coding of image data for the coding line is initiated, as indicated by the numeral 242. Consequently, a horizontal mode code is determined by the two-dimensional data compression circuit 50 in accordance with Table I above and assembled into the coded image data for storage or transmission. Also, the position of $a_0$ is set on the position $a_2$, as indicated by the numeral 244, for the purpose of coding the remainder of the coding line.

If on the other hand the distance $a_1b_1$ is less than or equal to three, vertical mode coding of image data for the coding line is initiated, as indicated by the numeral 246. Consequently, a vertical mode code is determined by the two-dimensional data compression circuit 50 in accordance with Table I above. Also, the position of $a_0$ is set on the position of $a_1$, as indicated by the numeral 248, for the purpose of coding the remainder of the coding line.

The coded image data for the coding line produced by two-dimensional image coding are then fed to the block coding circuit 190 via the bus 192, as indicated by the numeral 250. The block coding circuit 190 detects a sequence or run of vertical mode codes which can appear in the coded image data for the coding line, such as a predetermined run of a given vertical mode code, as indicated by the numeral 252. For example, the presence of eleven consecutive V(0) codes can be detected.

The presence of a predetermined run of a given vertical mode code is checked, as indicated by the numeral 254. If on the one hand a predetermined run of a given vertical mode code is present, a single block code word is substituted for the predetermined run of the given vertical mode code, as indicated by the numeral 256, and the block code word is assembled into the coded image data for storage or transmission. If on the other hand a predetermined run of the given vertical mode code is not present in the coded image data, the original vertical mode code words are assembled into the coded image data for storage or transmission.

After image data for the coding line is coded utilizing either horizontal mode coding, as indicated by the numeral 242, or vertical mode coding, as indicated by the numeral 246, and/or block coding, as indicated by the numeral 256, the image data for the coding line is checked for the purpose of determining whether or not the entire coding line has been coded, as indicated by the numeral 258. If on the one hand the image data for the coding line has not been completely coded, the position of $a_1$, the position of $b_1$, and the position of $b_2$ are detected, as indicated by the numerals 226, 228, and 230, respectively. Thereafter, the position of $b_2$ vis-a-vis the position of $a_1$ is checked, as indicated by the numeral 232, for the purpose of determining whether or not pass mode coding is appropriate. If pass mode coding of the additional image data for the coding line is appropriate, pass mode coding is again initiated, as indicated by the numeral 234. If pass mode coding is not appropriate, the distance $a_1b_1$ is checked, as indicated by the numeral 238, for the purpose of determining whether horizontal mode coding is again initiated, as indicated by the numeral 242, or, alternatively, vertical mode coding and/or block coding is initiated, as indicated by the numerals 246 and 256, respectively.

The coding line is then checked to determine whether or not the coding line is the final scan line of the image to be coded, as indicated by the numeral 214. If on the one hand the coding line is not the final scan line of the image to be coded, the index M is set equal to (M+1), as indicated by the numeral 202, and the coding for the next scan line to be coded is determined analogously to the determination described above. If on the other hand the coding line corresponds to the final scan line of the image, an RTC is assembled into the coded image data for storage or transmission, as indicated by the numeral 260, which completes coding of the image.

In summary, in accordance with the just-described alternative embodiment of the block coding method and apparatus of the invention, the vertical mode codes are checked before the image data for the current scan line are stored or transmitted after being coded by means of the two-dimensional image coding process, such as the known CCITT facsimile data compression coding algorithms with the vertical mode coding technique. A block code for the current scan line can be substituted based on recognition of the presence of a sequence or run of vertical mode codes, such as a predetermined run of a given vertical mode code. Preferably, the presence of a sequence or run of identical vertical mode codes is recognized. If such a run of identical vertical mode codes is recognized, a single block code is substituted for the multiplicity of vertical mode codes.

Figure 11:
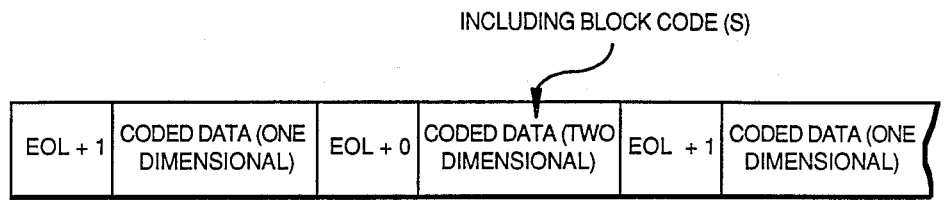
FIG. 11 illustrates the format for image data for the initial scan lines of an image.

FIG. 11 shows the format for several coded scan lines of image data starting at the beginning of an image on a page. As shown in FIG. 11, the image data coded in accordance with the block coding method and apparatus of the invention comprises the initially coded scan line $l_1$, which is represented by EOL plus the tag bit 1 for the purpose of indicating that the scan line $l_1$ is coded utilizing one-dimensional image coding, followed by the coded image data for the scan line $l_1$, which is coded utilizing one-dimensional image coding. As shown in FIG. 11, the next scan line $l_2$ is coded utilizing two-dimensional image coding. Accordingly, the coded image data for the scan line $l_2$ comprises EOL plus the tag bit 0 followed by coded image data for the scan line $l_1$ coded utilizing two-dimensional image coding. Additionally, in accordance with the block coding method and apparatus of the invention, the coded image data for the scan line $l_2$ can include one or more block codes which supplant detected or recognized sequences or runs of vertical mode codes produced utilizing two-dimensional image coding. Unlike the image data produced by the known CCITT data compression coding algorithms, the coded image data, including vertical mode codes as modified by the substitution of block codes for detected or recognized runs of vertical mode codes, such as predetermined runs of a given vertical mode code, are not followed by fill for the purpose of providing a minimum transmission time of a total coded scan line.

Subsequent scan lines are coded utilizing one-dimensional image coding or two-dimensional image coding, as determined by the data compression coding algorithms. As shown in FIG. 11, the data compression coding algorithms can direct a return to one-dimensional image coding under various circumstances.

Figure 12:
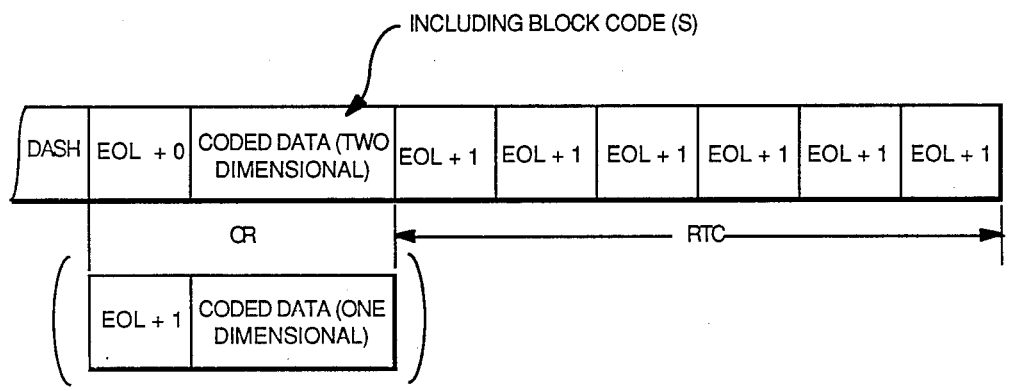
FIG. 12 illustrates the format for image data for the concluding scan lines of an image.

FIG. 12 shows the format for the last several coded scan lines of image data for an image on a page. As shown in FIG. 12, the concluding scan lines $l_V$, $l_W$, ..., $l_M$ are coded similarly to the scan lines $l_2$, $l_3$, ..., $l_U$ until the final scan line $l_M$ is coded. After the last scan line $l_M$ has been coded, an RTC, which comprises $6\times(EOL+1)$, is stored or transmitted for the purpose of indicating that coding of the image data for the image is completed.

The method and apparatus in accordance with the invention have been described in connection with facsimile transmission in which eleven consecutive V(0) code words are represented as a single block code word. The determination to substitute a single block code word for eleven consecutive V(0) code words is based on analysis of scan lines coded by two-dimensional image coding using a reference scan line selected in accordance with the reference scan line selection method and apparatus disclosed in U.S. Ser. No. 06/749,606, which produces V(0) codes on a frequent basis. The block coding method and apparatus in accordance with the invention can alternatively be used in connection with a different given vertical mode code and with other length sequences of the given vertical mode code and even can be used in connection with recurring sequences of mixed vertical mode codes.

The block coding method and apparatus in accordance with the invention provide for selecting a block code in connection with two-dimensional image coding, such as vertical mode coding, compatible with two-dimensional data compression coding algorithms such as the CCITT facsimile data compression coding algorithms in accordance with the specifications described in "STANDARDIZATION OF GROUP 3 FACSIMILE APPARATUS FOR DOCUMENT TRANSMISSION," CCITT Recommendation T.4 (Geneva, 1980). The block coding method and apparatus in accordance with the invention are particularly useful for coding an image to allow enhanced data compression in connection with facsimile transmission, thereby reducing the cost for operation of the facsimile transmission apparatus through a reduction in the cost for use of the communication link. This provides an improvement over known image coding techniques in connection with data compression, including the known vertical mode coding technique, and can be applied to any coding technique that uses either previously stored image data or a collection of predetermined image data patterns as a reference for compressing image data to be stored or transmitted. This reduces the amount of storage required or the amount of image data transmitted over a communication link and thus reduces operating cost.

The foregoing description is offered primarily for purposes of illustration. While a variety of embodiments has been disclosed, it will be readily apparent to those skilled in the art that numerous modifications and variations not mentioned above can still be made without departing from the spirit and scope of the invention as claimed below.

What is claimed is:

1. A method for processing image data for data compression, said image data representing a two-dimensional image, said image data defining successive input scan lines, said method comprising the steps of:

establishing one of said scan lines as a current scan line;

establishing another of said scan lines as a reference scan line;

using said current scan line and said reference scan line in connection with a two-dimensional image coding process to produce vertical mode codes;

detecting a predetermined run of a given vertical mode code within coded image data produced during said image coding process; and substituting a preselected block code for said predetermined run of said given vertical mode code.

2. The method of claim 1 wherein said predetermined run of said given vertical mode code is a run of eleven consecutive vertical offset zero (V(0)) codes.

3. The method of claim 1 wherein said predetermined run of said given vertical mode code is a predetermined run of vertical offset zero (V(0)) codes.

4. The method of claim 3 wherein said scan lines include a first scan line, a second scan line immediately preceding said first scan line, and a third scan line preceding said first scan line, said first scan line being established as said current scan line;

wherein said step of establishing said reference scan line comprises the step of selecting said reference scan line from among said preceding second scan line and said preceding third scan line; and wherein said two-dimensional image coding process is a coding process wherein data compression is directly related to a pattern relationship between said current scan line and said reference scan line.

5. The method of claim 4 wherein said selecting step comprises defining as said reference scan line said preceding third scan line, said preceding third scan line being located at a fixed, preselected line separation from said current scan line.

6. The method of claim 4 wherein said selecting step comprises the steps of:

comparing said current scan line with each one of at least two candidate scan lines selected from ones of said input scan lines preceding said current scan line to obtain pattern relationship criteria, said candidate scan lines including said preceding second scan line and said preceding third scan line; and choosing as said reference scan line the one of said candidate scan lines which yields a most desired one of said pattern relationship criteria relative to said current scan line.

7. The method of claim 6 wherein said comparing step comprises the steps of:

applying a vertical mode coding technique to said current scan line using each of said candidate scan lines as a coding reference for said current scan line to obtain compressed image data comprising output bits; and determining the number of output bits obtained in said applying step by using each of said candidate scan lines as a coding reference for said current scan line; and wherein said choosing step comprises:

selecting as said reference scan line the candidate scan line for which the least number of output bits was obtained.

8. The method of claim 6 wherein said comparing step comprises:

summing differences between image data of said current scan line and corresponding image data of each said candidate scan line; and wherein said choosing step comprises:

selecting as said reference scan line the candidate scan line yielding the least number of said differences.

9. The method of claim 8 wherein said comparing step further comprises:

exclusive-OR combining image data of each said candidate scan line with corresponding image date of said current scan line.

10. An apparatus for processing image data for data compression, said image data representing a two-dimensional image, said image data defining successive input scan lines, said apparatus comprising:
   means for establishing one of said scan lines as a current scan line;
   means for establishing another of said scan lines as a reference scan line;
   means for using said current scan line and said reference scan line in connection with a two-dimensional image coding process to produce vertical mode codes; and
   block coding means for substituting a preselected block code for a predetermined run of a given vertical mode code within coded image data produced during said image coding process.

11. The apparatus of claim 10 wherein said predetermined run of said given vertical mode code is a run of eleven consecutive vertical offset zero (V(0)) codes.

12. The apparatus of claim 10 wherein said predetermined run of said given vertical mode code is a predetermined run of vertical offset zero (V(0)) codes.

13. The apparatus of claim 12 wherein said scan lines include a first scan line, a second scan line immediately preceding said first scan line, and a third scan line preceding said first scan line, said first scan line being established as said current scan line;
   wherein said means for establishing said reference scan line comprises means for selecting said reference scan line from among said preceding second scan line and said preceding third scan line; and
   wherein said two-dimensional image coding process is a coding process wherein data compression is directly related to a pattern relationship between said current scan line and said reference scan line.

14. The apparatus of claim 13 wherein said selecting means comprises means for defining as said reference scan line said preceding third scan line, said preceding third scan line being located at a fixed, preselected line separation from said current scan line.

15. The apparatus of claim 13 wherein said selecting means comprises:
   means for comparing said current scan line with each one of at least two candidate scan lines selected from ones of said input scan lines preceding said current scan line to obtain pattern relationship criteria, said candidate scan lines including said preceding second scan line and said preceding third scan line; and
   means for choosing as said reference scan line the one of said candidate scan lines which yields a most desired one of said pattern relationship criteria relative to said current scan line.

16. The apparatus of claim 15 wherein said comparing means comprises:
   means for applying a vertical mode coding technique to said current scan line using each of said candidate scan lines as a coding reference for said current scan line to obtain compressed image data comprising output bits; and
   means for determining the number of output bits obtained by said applying means by using each of said candidate scan lines as a coding reference for said current scan line; and wherein said choosing means comprises:
   means for selecting as said reference scan line the candidate scan line for which the least number of output bits was obtained.

17. The apparatus of claim 15 wherein said comparing means comprises:
   means for summing differences between image data of said current scan line and corresponding image data of each said candidate scan line; and wherein said choosing means comprises:
   means for selecting as said reference scan line the candidate scan line yielding the least number of said differences.

18. The apparatus of claim 17 wherein said comparing means further comprises:
   exclusive-OR means operative to combine image data of each said candidate scan line with corresponding image data of said current scan line.

* * * * *